(12) United States Patent
Irie et al.

(10) Patent No.: US 8,698,850 B2
(45) Date of Patent: Apr. 15, 2014

(54) DISPLAY DEVICE AND METHOD FOR DRIVING SAME

(75) Inventors: Kentaro Irie, Osaka (JP); Masae Kawabata, Osaka (JP); Hiroto Suzuki, Osaka (JP); Fumikazu Shimoshikiryo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 275 days.

(21) Appl. No.: 12/998,698

(22) PCT Filed: Aug. 25, 2009

(86) PCT No.: PCT/JP2009/064786
§ 371 (c)(1),
(2), (4) Date: May 20, 2011

(87) PCT Pub. No.: WO2010/073775
PCT Pub. Date: Jul. 1, 2010

(65) Prior Publication Data
US 2011/0221760 A1 Sep. 15, 2011

(30) Foreign Application Priority Data
Dec. 25, 2008 (JP) ................................. 2008-330865

(51) Int. Cl.
*G09G 5/10* (2006.01)
*G09G 3/36* (2006.01)

(52) U.S. Cl.
USPC .................. 345/690; 345/87; 345/89; 345/96

(58) Field of Classification Search
USPC ...................................... 345/89, 96, 690–693
See application file for complete search history.

(56) References Cited

U.S. PATENT DOCUMENTS

| 4,792,857 A | 12/1988 | Akiyama |
| 5,457,474 A | 10/1995 | Ikeda |

(Continued)

FOREIGN PATENT DOCUMENTS

| CN | 101131808 | 2/2008 |
| CN | 101320179 | 12/2008 |

(Continued)

OTHER PUBLICATIONS

Office Action for co-pending U.S. Appl. No. 12/998,833 dated Feb. 13, 2013.

(Continued)

*Primary Examiner* — Ilana Spar
(74) *Attorney, Agent, or Firm* — Harness, Dickey & Pierce, P.L.C.

(57) ABSTRACT

In at least one embodiment, a display device includes: a correction section for carrying out gray scale correction on gray scale data to be supplied to a display driver, by use of a correction amount corresponding to a position of each column to which the data signal is to be supplied, the each column being on a display panel, the correction section carrying out the gray scale correction by setting the correction amount to zero for at least (i) gray scale data corresponding to a lowest positive-polarity data signal potential and (ii) gray scale data corresponding to a lowest negative-polarity data signal potential of first gray scale data to be supplied to at least one column constituting a part of all columns, the gray scale data (i) and (ii) being among the gray scale data inputted into the correction section.

22 Claims, 13 Drawing Sheets

(56) References Cited

U.S. PATENT DOCUMENTS

| | | | |
|---|---|---|---|
| 5,699,076 A | 12/1997 | Tomiyasu | |
| 6,310,594 B1 * | 10/2001 | Libsch et al. | 345/90 |
| 6,335,719 B1 | 1/2002 | An et al. | |
| 6,791,566 B1 | 9/2004 | Kuratomi et al. | |
| 6,903,716 B2 | 6/2005 | Kawabe et al. | |
| 2001/0022565 A1 | 9/2001 | Kimura | |
| 2002/0030647 A1 | 3/2002 | Hack et al. | |
| 2003/0090449 A1 | 5/2003 | Arimoto et al. | |
| 2003/0201955 A1 | 10/2003 | Song et al. | |
| 2003/0227429 A1 | 12/2003 | Shimoshikiryo | |
| 2005/0036075 A1 * | 2/2005 | Taoka et al. | 348/761 |
| 2005/0213015 A1 | 9/2005 | Shimoshikiryo | |
| 2006/0007094 A1 | 1/2006 | Kang et al. | |
| 2006/0023137 A1 | 2/2006 | Kamada et al. | |
| 2006/0041805 A1 | 2/2006 | Song | |
| 2006/0256271 A1 | 11/2006 | Shimoshikiryo | |
| 2007/0052643 A1 | 3/2007 | Li et al. | |
| 2007/0229447 A1 | 10/2007 | Takahara et al. | |
| 2008/0012840 A1 | 1/2008 | Higashino et al. | |
| 2008/0074404 A1 * | 3/2008 | Sashida | 345/204 |
| 2008/0191985 A1 | 8/2008 | Katayama et al. | |
| 2009/0167964 A1 | 7/2009 | Lebrun et al. | |
| 2010/0045708 A1 | 2/2010 | Higashino | |
| 2010/0097366 A1 | 4/2010 | Kitayama et al. | |
| 2010/0118012 A1 | 5/2010 | Irie et al. | |
| 2011/0063330 A1 * | 3/2011 | Bae et al. | 345/690 |
| 2011/0170014 A1 | 7/2011 | Irie et al. | |
| 2011/0221970 A1 | 9/2011 | Kawabata et al. | |
| 2011/0221971 A1 | 9/2011 | Shimoshikiryoh et al. | |
| 2011/0221972 A1 | 9/2011 | Kawabata et al. | |

FOREIGN PATENT DOCUMENTS

| | | | |
|---|---|---|---|
| CN | 102160108 | | 8/2011 |
| EP | 1 286 202 | | 2/2003 |
| FR | 2 894 369 | | 6/2007 |
| JP | 6222330 | | 8/1994 |
| JP | 07134572 | | 5/1995 |
| JP | 11352938 | | 12/1999 |
| JP | 2000098343 A | | 4/2000 |
| JP | 2001-051252 | | 2/2001 |
| JP | 2002055675 A | | 2/2002 |
| JP | 2002123209 A | * | 4/2002 |
| JP | 2002123209 A | | 4/2002 |
| JP | 2002140029 A | | 5/2002 |
| JP | 2002251170 A | | 9/2002 |
| JP | 2004-004857 | | 1/2004 |
| JP | 2004-046236 | | 2/2004 |
| JP | 200462146 | | 2/2004 |
| JP | 2004294540 A | | 10/2004 |
| JP | 2006-039542 | | 2/2006 |
| JP | 2006030834 A | | 2/2006 |
| JP | 2006039290 | | 2/2006 |
| JP | 2007025239 A | | 2/2007 |
| JP | 2007-286135 | | 11/2007 |
| JP | 2008-107369 | | 5/2008 |
| JP | 2008145471 A | | 6/2008 |
| KR | 10-2008-0086617 | | 9/2008 |
| WO | WO 02063384 | | 8/2002 |
| WO | WO-2008065773 A1 | | 6/2008 |
| WO | WO 2008139693 | | 11/2008 |
| WO | WO 2008139695 | | 11/2008 |

OTHER PUBLICATIONS

Hori, Hiroo, and Koji Suzuki, eds. "Series Advanced Display Technologies 2—Color Liquid Crystal Display". Kyoritsu Shuppan Col, Ltd. 1st Ed. Jun. 25, 2001. pp. 247-248.

Office Action for co-pending U.S. Appl. No. 12/998,833 dated Sep. 17, 2012.

U.S. Office Action issued in U.S. Appl. No. 12/998,725 dated May 3, 2013.

European Search Report dated Apr. 12, 2012, issued in Internation Application No. 09828934.1.

U.S. Office Action issued in U.S. Appl. No. 12/998,731 dated May 9, 2013.

U.S. Advisory Action issued in U.S. Appl. No. 12/998,833, dated Jun. 4, 2013.

U.S. Office Action issued in U.S. Appl. No. 12/998,731, dated Sep. 4, 2013.

U.S. Office Action issued in U.S. Appl. No. 12/998,725, dated Sep. 4, 2013.

* cited by examiner (a)

| Input Gray Scale Level | Output Gray Scale Level | | | | | |
|---|---|---|---|---|---|---|
| | Position A | | Position B | | Position C | |
| | Vsp | Vsn | Vsp | Vsn | Vsp | Vsn |
| . | . | . | . | . | . | . |
| . | . | . | . | . | . | . |
| . | . | . | . | . | . | . |
| 256 | 374 | 152 | 340 | 180 | 266 | 246 |
| . | . | . | . | . | . | . |
| 512 | 585 | 448 | 563 | 466 | 522 | 502 |
| . | . | . | . | . | . | . |

DISPLAY DEVICE AND METHOD FOR DRIVING SAME

TECHNICAL FIELD

The present invention relates to a technique for improving an in-plane distribution of display quality in a display panel.

BACKGROUND ART

In an active matrix liquid crystal display device adopting TFTs as selection elements of respective picture elements, it is well known that a feed through phenomenon occurs (See Non-Patent Document 1, for example). The following briefly explains such a feed through phenomenon.

FIG. 8 is an equivalent circuit of one picture element. One picture element PIX is provided so as to correspond to an intersection of a gate bus line GL and a source bus line SL. The picture element PIX includes a TFT 101, a liquid crystal capacitance Clc, and a storage capacitance Cs. In addition, the picture PIX, in general, includes a parasitic capacitance such as a capacitance Cgd or the like formed between a picture element electrode 102 and the gate bus line GL. A gate of the TFT 101 is connected to the gate bus line GL; a source of the TFT 101 is connected to the source bus line SL; and a drain of the TFT 101 is connected to the picture element electrode 102. The liquid crystal capacitance Clc is formed in a configuration in which a liquid crystal layer is provided between the picture element electrode 102 and a common electrode to which a voltage Vcom is applied. The storage capacitance Cs is formed in a configuration in which a dielectric layer is provided between (i) a storage capacitance bus line to which a voltage Vcs is applied and (ii) the picture element electrode 102 or an electrode that is connected to the picture element electrode 102. The voltage Vcs is equal to, for example, the voltage Vcom, but may also be a voltage of other value.

As shown in FIG. 9, to the gate bus line GL, a selection signal Vg is outputted from a gate driver. The selection signal Vg includes two value levels that include a gate high voltage Vgh and a gate low voltage Vgl. A gate pulse of the selection signal Vg has a peak-to-peak voltage expressed by Vgp-p=Vgh−Vgl. Further, to the source bus line SL, a positive-polarity data signal (hereinafter, referred to as a positive data signal) Vsp and a negative-polarity data signal (hereinafter, referred to as a negative data signal) Vsn are outputted from a source driver while these signals are switched to each other by AC drive.

FIG. 9 focuses on one picture element PIX and shows a state in which a positive data signal Vsp is written, as a data signal Vs, to the picture element electrode 102 in one frame period TF1, and in a next frame period TF2, a negative data signal Vsn is written to the picture element 102.

Prior to the frame period TF1, a potential Vdn has been written to the picture element electrode 102. In the frame period TF1, the gate pulse of the selection signal Vg is applied to the gate of the TFT 101 and the TFT 101 is turned ON. Then, a potential is written toward the Vsp of the data signal Vsp to the picture element electrode 102. As a result, the liquid crystal capacitance Clc and the storage capacitance Cs are charged. Then, when the gate pulse falls, the TFT 101 is turned OFF and the writing to the picture element electrode 102 ends. At this time, the gate pulse has an abrupt change from the gate high voltage Vgh to the gate low voltage Vgl. Accordingly, due to the feed through phenomenon via the capacitance Cgd that is the parasitic capacitance between the picture element electrode 102 and the gate bus line GL, a potential of the picture element electrode 102 decreases by a voltage ΔVd and a potential of the picture element electrode 102 becomes Vdp that is lower than a potential of the data signal Vsp. This voltage ΔVd is called a feed through voltage. The voltage ΔVd is expressed as follows:

$$\Delta Vd = (Cgd/Cpix) \cdot Vgp\text{-}p \quad (1)$$
$$= (Cgd/Cpix) \cdot (Vgh - Vgl),$$

where Cpix is a total capacitance of a picture element that is a sum of the liquid crystal capacitance Clc, the storage capacitance Cs, and the parasitic capacitance such as the capacitance Cgd or the like. In a case where only the capacitance Cgd is taken into consideration as a parasitic capacitance in FIG. 8, Cpix=Clc+Cs+Cgd.

Prior to the frame period TF2, a potential Vdp has been written to the picture element electrode 102. In the frame period TF2, the gate pulse of the selection signal Vg is applied to the gate of the TFT 101 and the TFT 101 is turned ON. Then, a potential is written toward the potential Vsn of the data signal Vsn to the picture element electrode 102. As a result, the liquid crystal capacitance Clc and the storage capacitance Cs are charged. Then, as in the frame period TF1, when the gate pulse falls, a potential of the picture element electrode 102 decreases by a voltage ΔVd due to the feed through phenomenon via the capacitance Cgd and a potential of the picture element electrode 102 becomes Vdn that is lower than a potential of the data signal Vsn.

In the liquid crystal display panel, due to the occurrence of this feed through phenomenon, in a case where the voltage Vcom is set to the center of a voltage range between a voltage range of the positive data signal Vsp and a voltage range of the negative data signal Vsn, the voltage Vcom becomes a value that is shifted to a higher value by ΔVd from the center value of a voltage range between a positive range and a negative range of the voltages held after writing to the picture element electrode 102. Accordingly, in each picture element PIX, positive-polarity and negative-polarity voltages across the liquid crystal layer have different effective values. This causes deterioration in display quality and deterioration in liquid crystals.

In order to solve this problem, it is possible to take a method according to which, by correcting gray scale data to be supplied to the source driver by a change amount of ΔVd in advance, an influence of the feed through phenomenon is compensated. That is, a voltage of the data signal supplied to the picture element PIX decreases by ΔVd after completion of writing to the picture element electrode 102. This means that, substantially, the source driver supplies, to the picture element PIX, data signal that is lower by ΔVd than a target value. Therefore, the gray scale data to be supplied to a display controller is corrected to gray scale data corresponding to a data signal whose voltage is shifted so as to be increased by the voltage ΔVd. Then, thus corrected gray scale data is supplied to the source driver.

However, on the display panel, the gate bus line GL has a resistance component and a capacitance component as distributed constants. Accordingly, the gate pulse outputted from the gate driver to the gate bus line GL reaches, with a propagation delay, the gate of the TFT 101 of each picture element PIX. As a result, a waveform of the gate pulse receives a greater influence of the delay at a position farther from a position at which the gate driver outputs the gate pulse. For example, as shown in FIG. 10, in a case where a gate pulse VG(j) of the j-th gate bus line GL is generated by the gate driver and a waveform of this gate pulse VG (j) is an ideal square pulse, a delay of a gate pulse Vg (1, j) that reaches a picture element PIX of a first column of the j-th line is small whereas a delay of a gate pulse Vg (N, j) that reaches a picture element PIX of an Nth column of the j-th line is large.

A threshold voltage VT of the TFT 101 is present as a potential at some midpoint in a fall of the gate pulse. Accordingly, if the gate pulse falls slowly due to the delay, a smaller change amount SyN per time unit in the fall of the gate pulse shown in FIG. 10 results in a longer transition time that the TFT 101 takes for transition to an OFF state. In addition, in such a case, a waveform of the gate pulse has a gentler slope, before the gate pulse decays to a gate low level after the TFT 101 is turned OFF. As a result, a feed through regarding the capacitance Cgd becomes smaller. This makes ΔVd smaller. This is inconsistent with the expression (1) that can be derived from an electrostatic solution that employs only the law of conservation of charge.

In other words, a change amount SyN is smaller when a distance from a position of the output of the gate driver to the gate is larger. Accordingly, the voltage ΔVd has a distribution such that the voltage ΔVd is smaller in a picture element PIX that has a larger distance from the position of the output of the gate driver on the display panel. In FIG. 10, in a picture element PIX to which a gate pulse Vg (1, j) with a small delay is applied, a potential of the picture element electrode 102 abruptly changes and a decrease of ΔVd(1) in potential occurs. Meanwhile, in a picture element PIX to which a gate pulse Vg (N, j) with a large delay is applied, a potential of the picture element electrode 102 slowly changes and a decrease of ΔVd(N) in potential occurs. Here, ΔVd(1)>ΔVd(N).

For the above reason, in a case where all gray scale data that is to be supplied to the source driver is uniformly corrected, a feed through phenomenon cannot be cancelled out uniformly within a plane of the panel. As a result, unevenness in display quality occurs.

In order to solve this problem, for compensating the feed through phenomenon by correcting the gray scale data, a certain distribution in correction amount of the gray scale data is provided within the plane of the panel.

For example, in the display panel as shown in (a) of FIG. 11, the gate pulse is supplied to each gate bus line from both sides of the panel. Accordingly, in a case where a position on the display panel is expressed by using a position of a column, the closer to a column at an end section A of the panel a picture element PIX is, the larger a voltage ΔVd of this picture element PIX becomes. Meanwhile, in such a case, the closer to a column at a center section C of the panel a picture element PIX is, the smaller a voltage ΔVd of this picture element PIX becomes. Accordingly, as shown in (b) of FIG. 11, in a case where a positive data signal Vsp or negative data signal Vsn corresponding to certain gray scale data is uniformly set as indicated by a dotted line within the plane of the panel (i.e., in a left-right direction of the panel), both a positive picture element electrode potential Vdp and a negative picture electrode potential Vdn of a picture element electrode potential Vd after the occurrence of the feed through phenomenon shows a distribution in a curved form, as shown by a solid line, which is convex upward and has a top at the column at the center section C of the panel. In this case, the voltage across the liquid crystal layer in accordance with positive gray scale data is the largest at the center section C of the panel and gradually decreases towards end sections A of the panel from the center section C through intermediate sections B of the panel. Meanwhile, the voltage across the liquid crystal layer in accordance with negative gray scale data is the smallest at the center section C and gradually increases towards the end sections A from the center section C through the intermediate sections B of the panel. Accordingly, as indicated by the dotted line in (c) of FIG. 11, gray scale data of picture elements are corrected so that, before the gray scale data is supplied to the display driver, the distribution of the voltage ΔVd is compensated in advance, that is, the gray scale data has a distribution in which data signal voltages Vdp and Vdn are higher at positions closer to the end sections A of the panel. This makes the picture element electrode potentials Vdp and Vdn after the occurrence of the feed through phenomenon be uniform, as indicated by the solid line, within the panel plane.

In the correction of the gray scale data, now, a case where gray scale levels closer to a normally black or white level are set to be on a lower gray scale level side is considered. In this case, as show in FIG. 12, positive input gray scale data is corrected so that: a value of gray scale data to be supplied to a picture element PIX at the center section C of the panel is increased only by a small number of gray scale levels; and a value of gray scale data is increased by a larger number of gray scale levels as a position of a picture element PIX to which the gray scale data is supplied approaches either of the end sections A from the center section C of the panel. Meanwhile, negative input gray scale data is corrected so that: a value of gray scale data to be supplied to a picture element PIX at the center section C of the panel is decreased only by a small number of gray scale levels; and a value of gray scale data is decreased by a larger number of gray scale levels as a position of a picture element PIX to which the gray scale data is supplied approaches either of the end sections A from the center section C of the panel.

In this way, in a case where the gray scale data is corrected so that the in-plane distribution of the voltage ΔVd is compensated, potentials are written to the picture elements PIX in accordance with data signals corresponding to corrected gray scale data. Therefore, even in a case where a potential of the picture element electrode 102 decreases by the voltage ΔVd after the writing, it is possible to make the positive data signal and the negative data signal uniformly have effective values equal to each other in a plane while the common electrode potential Vcom is not changed.

CITATION LIST

Patent Literature

[Patent Literature 1]
Japanese Patent Application Publication, Tokukaihei, No. 7-134572 A (published on May 23, 1995)
[Patent Literature 2]
Japanese Patent Application Publication, Tokukaihei, No. 2002-251170 A (published on Sep. 6, 2002)
[Patent Literature 3]
Japanese Patent Application Publication, Tokukaihei, No. 2002-123209 A (published on Apr. 26, 2002)

Non-Patent Literature

[Non-Patent Literature 1]
Hori, Hiroo, and Koji Suzuki, eds. "Series Advanced Display Technologies 2—Color Liquid Crystal Display". Kyoritsu Shuppan Col, Ltd. $1^{st}$ Ed. Jun. 25, 2001. pp 247-248.

SUMMARY OF INVENTION

Technical Problem

However, when gray scale data is corrected as shown in FIG. 12, a correction amount corresponding to each position is added to an original gray scale level all over a display area. As a result, a gray scale range that can be used for display is reduced by a gray scale range corresponding to the correction amount. Consequently, a reproduction range becomes narrower.

This problem is explained with reference to FIG. 13. FIG. 13 is a diagram illustrating gray scale correction in a case where in consideration of an in-plane distribution, compensation of a voltage ΔVd is carried out on input gray scale data having 256 gray scale levels of "0" to "255" in a total gray scale range so as to produce gray scale data to be supplied to a source driver. A sign VH is added ahead of the numbers "0" to "255" indicative of gray scale levels in the case of a potential corresponding to positive gray scale data. Meanwhile, a sign VL is added ahead of the numbers "0" to "255" indicative of gray scale levels in the case of a potential corresponding to negative gray scale data. These commonly apply throughout the present specification.

Regarding the lowest positive gray scale data, in a case where it is desired that picture element electrode potentials are uniformly set to VH0 within a plane after the occurrence of a feed through phenomenon, input gray scale data "0" is corrected by increasing respective gray scale levels at both end sections A of the panel by ap1, gray scale levels at intermediate sections B of the panel by bp1, and a gray scale level at a center section C of the panel by cp1. Here, ap1>bp1>cp1>0. Further, regarding the highest positive gray scale data, in a case where it is desired to set respective values of the picture element electrode potentials to be as high as possible as well as making the picture element electrode potentials uniform within the plane after the occurrence of the feed through phenomenon, gray scale data at both end sections A of the panel is corrected to "255" while gray scale levels at the intermediate sections B of the panel are kept to be lower by bp2 than those at the both end sections A of the panel and further a gray scale level at the center section B of the panel is kept to be lower by cp2 than those of the both end sections A of the panel. The bp2 above is the same as a difference in input gray scale level between the intermediate sections B and the both end sections A of the panel. The cp2 above is the same as a difference in input gray scale level between the center section C and the both end sections A of the panel. In this case, after the occurrence of the feed through phenomena, the picture element electrode potential corresponding to the highest gray scale data is uniform at VH255' within the plane.

Regarding the highest negative gray scale data, in a case where it is desired that picture element electrode potentials are uniformly set to VL255 within the plane after the occurrence of a feed through phenomenon, input gray scale data "255" is corrected by decreasing respective gray scale levels at the both end sections A of the panel by an1, gray scale levels at intermediate sections B of the panel by bn1, and a gray scale level at a center section C of the panel by cn1. Here, an1>bn1>cn1>0. Further, regarding the lowest negative gray scale data, in a case where it is desired to set respective values of the picture element electrode potentials to be as low as possible as well as making the picture element electrode potentials uniform within the plane after the occurrence of the feed through phenomenon, gray scale data at both end sections A of the panel is corrected to "0" while gray scale levels at the intermediate sections B of the panel are kept to be lower by bn2 than those at the both end sections A of the panel and further a gray scale level at the center section B of the panel is kept to be lower by cn2 than those of the both end sections A of the panel. The bn2 above is the same as a difference in input gray scale level between the intermediate sections B and the both end sections A of the panel. The cn2 above is the same as a difference in input gray scale level between the center section C and the both end sections A of the panel. In this case, after the occurrence of the feed through phenomenon, the picture element electrode potential corresponding to the highest gray scale data is uniform at VL0' within the plane.

Further, a common electrode potential Vcom is set to a potential that has a center value between the potential VH0 and the potential VL0'.

As a result of this gray scale correction, an output gray scale range that can be expressed in display by the picture elements PIX after the occurrence of a feed through phenomenon is a gray scale range Rvp that corresponds to voltages corresponding to potentials from VH255' to VH0 in regard to positive gray scale data, and the output gray scale range is a gray scale range Rvn that corresponds to voltages corresponding to potentials from VL0' to VL255 in regard to negative gray scale data. Note that gray scale gradients are designed as appropriate within each of the gray scale range Rvp and the gray scale range Rvn.

The following describes a specific example of gray scale correction, as described above, for compensating the voltage ΔVd in accordance with a position of a column, by using lookup tables provided inside a display controller. The lookup tables store relations between input gray scale data and corrected gray scale data. Table 1 shows a lookup table for positive gray scale data, and Table 2 shows a lookup table for negative gray scale data.

TABLE 1

| Input Gray Scale Level | (End) | Corrected Gray Scale Level Corresponding To Column Position | | | | | | (Center) |
|---|---|---|---|---|---|---|---|---|
| | 1 | 96 | 192 | 288 | 384 | 576 | 768 | 960 |
| 0 | 14 | 14 | 13 | 13 | 13 | 12 | 10 | 10 |
| 8 | 20 | 19 | 19 | 19 | 18 | 18 | 18 | 18 |
| 16 | 31 | 29 | 29 | 29 | 28 | 27 | 27 | 26 |
| 24 | 47 | 43 | 42 | 41 | 40 | 37 | 36 | 34 |
| 32 | 77 | 62 | 60 | 59 | 55 | 48 | 46 | 42 |
| 40 | 108 | 88 | 86 | 82 | 74 | 64 | 57 | 50 |
| 48 | 129 | 107 | 104 | 101 | 90 | 78 | 69 | 58 |
| 64 | 157 | 133 | 130 | 126 | 117 | 102 | 90 | 74 |
| 96 | 194 | 173 | 169 | 165 | 155 | 139 | 124 | 106 |
| 128 | 233 | 206 | 203 | 199 | 189 | 173 | 159 | 138 |
| 192 | 310 | 283 | 277 | 273 | 261 | 241 | 226 | 202 |
| 256 | 374 | 349 | 344 | 340 | 327 | 308 | 291 | 266 |
| 320 | 419 | 404 | 400 | 396 | 387 | 368 | 353 | 330 |
| 384 | 454 | 440 | 438 | 436 | 430 | 419 | 411 | 394 |
| 448 | 513 | 498 | 497 | 494 | 487 | 478 | 470 | 458 |
| 512 | 585 | 568 | 566 | 563 | 557 | 545 | 536 | 522 |
| 576 | 647 | 632 | 629 | 627 | 620 | 610 | 600 | 586 |
| 640 | 711 | 694 | 691 | 688 | 683 | 672 | 664 | 650 |
| 704 | 776 | 762 | 760 | 757 | 750 | 738 | 729 | 714 |
| 768 | 818 | 811 | 811 | 809 | 806 | 798 | 791 | 778 |
| 832 | 864 | 859 | 858 | 857 | 855 | 850 | 847 | 842 |
| 864 | 893 | 888 | 887 | 887 | 884 | 881 | 879 | 874 |
| 896 | 920 | 916 | 916 | 915 | 914 | 911 | 909 | 906 |
| 928 | 948 | 945 | 945 | 944 | 943 | 941 | 940 | 938 |
| 960 | 976 | 974 | 974 | 974 | 973 | 972 | 971 | 970 |
| 992 | 1010 | 1008 | 1007 | 1007 | 1007 | 1005 | 1004 | 1002 |
| 1023 | 1023 | 1020 | 1020 | 1020 | 1020 | 1019 | 1014 | 1012 |

TABLE 2

| Input Gray Scale Level | (End) | Corrected Gray Scale Level Corresponding To Column Position | | | | | | (Center) |
|---|---|---|---|---|---|---|---|---|
| | 0 | 96 | 192 | 288 | 384 | 576 | 768 | 960 |
| 0 | 0 | 0 | 1 | 1 | 1 | 2 | 4 | 4 |
| 8 | 5 | 6 | 6 | 6 | 7 | 7 | 8 | 8 |
| 16 | 3 | 4 | 4 | 4 | 4 | 5 | 5 | 6 |

TABLE 2-continued

| Input Gray Scale Level | Corrected Gray Scale Level Corresponding To Column Position | | | | | | |
|---|---|---|---|---|---|---|---|
| | (End) 0 | 96 | 192 | 288 | 384 | 576 | 768 | (Center) 960 |
| 24 | 8 | 9 | 10 | 10 | 10 | 12 | 13 | 14 |
| 32 | 12 | 14 | 14 | 15 | 16 | 18 | 19 | 22 |
| 40 | 16 | 18 | 19 | 19 | 21 | 23 | 26 | 30 |
| 48 | 18 | 21 | 22 | 22 | 24 | 27 | 31 | 38 |
| 64 | 22 | 26 | 27 | 28 | 31 | 36 | 42 | 54 |
| 96 | 30 | 38 | 40 | 42 | 47 | 58 | 67 | 86 |
| 128 | 44 | 59 | 61 | 64 | 73 | 88 | 100 | 118 |
| 192 | 95 | 116 | 120 | 123 | 133 | 150 | 163 | 182 |
| 256 | 152 | 173 | 177 | 180 | 191 | 210 | 223 | 246 |
| 320 | 209 | 233 | 237 | 242 | 253 | 272 | 286 | 310 |
| 384 | 277 | 304 | 308 | 312 | 322 | 340 | 353 | 374 |
| 448 | 384 | 399 | 402 | 404 | 409 | 419 | 427 | 438 |
| 512 | 448 | 462 | 464 | 466 | 472 | 482 | 489 | 502 |
| 576 | 508 | 522 | 523 | 526 | 533 | 544 | 553 | 566 |
| 640 | 573 | 588 | 591 | 593 | 599 | 609 | 618 | 630 |
| 704 | 636 | 649 | 653 | 654 | 660 | 669 | 679 | 694 |
| 768 | 700 | 717 | 719 | 721 | 728 | 738 | 747 | 758 |
| 832 | 798 | 805 | 806 | 806 | 809 | 813 | 817 | 822 |
| 864 | 836 | 840 | 841 | 842 | 845 | 848 | 851 | 854 |
| 896 | 870 | 875 | 876 | 876 | 879 | 881 | 883 | 886 |
| 928 | 907 | 909 | 910 | 910 | 912 | 914 | 915 | 918 |
| 960 | 943 | 945 | 945 | 945 | 946 | 947 | 949 | 950 |
| 992 | 972 | 974 | 974 | 976 | 976 | 977 | 979 | 982 |
| 1023 | 999 | 1002 | 1002 | 1002 | 1002 | 1003 | 1008 | 1013 |

In descriptions of Tables 1 and 2, 256 gray scale levels of the above example expressed in 8 bits is converted into 1024 gray scale levels expressed in 10 bits. However, Tables 1 and 2 have the same meaning as tables of 256 gray scale levels. Further, on assumption that a display panel has a full high-definition television specification (1920×1080), that is, the number of columns is 1920 for each color of RGB, a relation between input gray scale data and corrected gray scale data after gray scale correction is shown for a range of column positions from 0 to 960 which corresponds to a half region of the display panel.

As shown in Table 1, regarding positive gray scale data, due to gray scale correction, 10 gray scale levels from "0" to "9" on a lowest gray scale level side are lost and 11 gray scale levels from "1013" to "1023" are lost on a highest gray scale level side at the center (corresponding to the center section C of the panel). Further, at edges (corresponding to the end sections A of the panel), 14 gray scale levels from "0" to "13" on the lowest gray scale level side are lost.

Further, as shown in Table 2, regarding negative gray scale data, due to gray scale correction, 4 gray scale levels from "0" to "3" on a lowest gray scale level side are lost and 10 gray scale levels from "1014" to "1023" are lost on a highest gray scale level side at the center (corresponding to the center section C of the panel). Further, at edges (corresponding to the end sections A of the panel), 24 gray scale levels from "1000" to "1023" on the highest gray scale level side are lost.

In this way, in gray scale correction in which the voltage ΔVd is compensated in consideration of the in-plane distribution, even at the center section C of the panel where the voltage ΔVd is the lowest in a full gray scale range of input gray scale data, cp1 of gray scale levels used as a correction amount cannot be used for display on the lowest positive gray scale data and the highest negative gray scale data. Further, in the vicinity of the highest positive gray scale data, cp2 of gray scale levels cannot be used, for maintaining a difference in gray scale level from the end sections A of the panel. In addition, in the vicinity of the lowest negative gray scale data, cn2 of gray scale levels cannot be used, for maintaining a difference in gray scale level from the end sections A of the panel. This narrows a reproduction range as a whole.

Further, at the center section C of the panel, even in a case where it is allowed to correct the highest positive gray scale data to the highest gray scale data (e.g., "255") of the input gray scale data or to correct the lowest negative gray scale data to the lowest gray scale data (e.g., "0") of the input gray scale data, it is not possible to carry out addition or subtraction of a correction amount that exceeds the maximum gray scale data of the input gray scale data and below the lowest gray scale data of the input gray scale data. As a result, a reproduction range as a whole still becomes narrower.

The same applies to the case for the negative gray scale data, but the above problems on the lowest gray scale level side and the highest gray scale level side regarding the positive gray scale data are reversed. Further, for columns closer to the end sections A of the panel, the gray scale correction is carried out in a greater scale as compared to that for a column at the center section C of the panel. Therefore, for the similar reason, a reproduction range becomes further narrower at the columns closer to the end sections A of the panel.

As a result, a part of all bits representing gray scale data cannot be expressed in display. That is, a phenomena that is a so-called "bit loss" occurs. This seriously damages display quality.

The present invention is attained in view of the above-described conventional problems. An object of the present invention is to realize a display device that is capable of ensuring a wide reproduction range while compensating, by correction of gray scale data, a phenomenon, such as a feed through phenomenon, in which an in-plane unevenness occurs in picture element electrode potential, and a method for driving the display device.

Solution to Problem

In order to solve the above problems, a display device of an active matrix type according to the present invention includes: a correction section for carrying out gray scale correction on gray scale data to be converted into a data signal, by use of a correction amount corresponding to a position of each column to which the data signal is to be supplied, the each column being on a display panel, the correction section carrying out the gray scale correction by setting the correction amount to zero for at least (i) gray scale data corresponding to a lowest positive-polarity data signal potential and (ii) gray scale data corresponding to a lowest negative-polarity data signal potential of first gray scale data to be supplied to at least one column constituting a part of all columns, the gray scale data (i) and (ii) being among the gray scale data inputted into the correction section.

According to the above invention, the correction section carries out gray scale correction on lowest positive-polarity gray scale data and lowest negative-polarity gray scale data for a position of at least one column constituting a part of all columns, by setting a correction amount to zero. That is, for the above-described data, the correction section outputs gray scale data equal to input gray scale data. This makes it possible to widen a gray scale range that can be used for display in a whole panel including not only the position of the at least one column but also respective positions of other columns, as compared to a conventional gray scale range that can be used for display in a whole panel.

As a result, it becomes possible to realize a display device capable of ensuring a wide reproduction range while compensating, by correction of gray scale data, a phenomenon, such as a feed through phenomenon, in which an in-plane distribution in picture element electrode potential occurs.

In order to solve the above problems, in the display device of the present invention: the correction section carries out the gray scale correction by setting the correction amount to zero for at least (i) gray scale data corresponding to a lowest positive-polarity data signal potential and (ii) gray scale data corresponding to a lowest negative-polarity data signal potential of first gray scale data to be supplied to at least one column positioned at a center out of all the columns, the gray scale data (i) and (ii) being among the gray scale data inputted.

According to the above invention, the correction section carries out gray scale correction on lowest positive-polarity gray scale data and lowest negative-polarity gray scale data for a position of at least one column positioned at the center among all columns, by setting a correction amount to zero. That is, for the above-described data, the correction section outputs gray scale data equal to input gray scale data. This makes it possible to widen a gray scale range that can be used for display in a whole panel including not only the position of the column at the center but also respective positions of other columns, as compared to a conventional gray scale range that can be used for display in a whole panel.

As a result, it becomes possible to realize a display device capable of ensuring a wide reproduction range particularly at a center section of the panel while compensating, by correction of gray scale data, a phenomenon, such as a feed through phenomenon, in which an in-plane distribution in picture element electrode potential occurs.

In order to solve the above problems, in the display device of the present invention: a highest positive-polarity data signal potential corresponding to the first gray scale data after the gray scale correction is lower than a highest positive-polarity data signal potential corresponding to the gray scale data other than the first gray scale data after the gray scale correction; and a highest negative-polarity data signal potential corresponding to the first gray scale data after the gray scale correction is lower than a highest negative-polarity data signal potential corresponding to the gray scale data other than the first gray scale data after the gray scale correction.

According to the above invention, in the whole panel, identical gray scale data supplied to the correction section is supplied as an identical data signal potential to a picture element electrode. In addition, positive-polarity gray scale data and negative-polarity gray scale data which have an identical gray scale level have equal effective voltage values to be applied to display elements such as liquid crystal display elements. This makes it possible to provide uniform display quality all over the panel.

In order to solve the above problems, in the display device of the present invention: for all the columns, the gray scale correction is carried out by setting the correction amount to zero for gray scale data corresponding to a highest positive-polarity data signal potential; and for all the columns, the gray scale correction is carried out by setting the correction amount to zero for gray scale data corresponding to a highest negative-polarity data signal potential.

According to the above invention, a full gray scale range can be used for display at a position of a certain column. This makes it possible to provide a high display quality.

In order to solve the above problems, in the display device of the present invention: for all the columns, the gray scale correction is carried out by setting the correction amount to zero for gray scale data corresponding to a highest positive-polarity data signal potential; and a highest negative-polarity data signal potential corresponding to the first gray scale data after the gray scale correction is higher than a highest negative-polarity potential corresponding to the gray scale data other than the first gray scale data after the gray scale correction.

According to the above invention, a full gray scale range can be used for display at a position of a certain column. This makes it possible to provide a high display quality. Further, at a position of each column, it is possible to arrange so that a difference between a common electrode potential and a picture element electrode potential corresponding to corrected positive-polarity gray scale data is equal to a difference between the common electrode potential and a picture element electrode potential corresponding to corrected negative-polarity gray scale data. This makes it possible to provide a high display quality.

In order to solve the above problems, a display device of an active matrix type according to the present invention includes: a correction section for carrying out gray scale correction on gray scale data to be converted into a data signal, by use of a correction amount corresponding to a position of each column to which the data signal is supplied, the each column being on a display panel, the correction section carrying out the gray scale correction by setting the correction amount to zero for (i) gray scale data corresponding a lowest positive-polarity data signal potential, (ii) gray scale data corresponding to a lowest negative-polarity data signal potential, (iii) gray scale data corresponding to a highest positive-polarity data signal potential, and (iv) gray scale data corresponding to a highest negative-polarity data signal potential for all the columns, the gray scale data (i), (ii), (iii), and (iv) being among the gray scale data inputted.

According to the above invention, the correction section carries out gray scale correction on lowest positive-polarity gray scale data, highest positive-polarity gray scale data, lowest negative-polarity gray scale data and highest negative-polarity gray scale data for respective positions of all columns, by setting a correction amount to zero. That is, for the above-described data, the correction section outputs gray scale data equal to input gray scale data. This makes it possible to widen a gray scale range that can be used for display in a whole panel, as compared to a conventional gray scale range that can be used for display in a whole panel.

As a result, it becomes possible to realize a display device capable of ensuring a wide reproduction range while compensating, by correction of gray scale data, a phenomenon, such as a feed through phenomenon, in which an in-plane distribution in picture element electrode potential occurs.

In order to solve the above problems, in the display device of the present invention, the gray scale data to be converted into the data signal is gray scale data to be supplied to a display driver.

According to the above invention, even in a case where a display driver does not have a function to carry out gray scale correction, it is possible to carry out gray scale correction in a circuit of a preceding stage such as a display controller.

In order to solve the above problems, in the display device of the present invention, a gate pulse is supplied to each gate bus line from each of both ends of the each gate bus line.

According to the above invention, in a display panel in which a phenomenon, such as a feed through phenomenon, relevant to a gate bus line occurs with a symmetrical magnitude distribution about the longitudinal center line, a display quality can be improved by gray scale correction that is performed so that the phenomenon is compensated.

In order to solve the above problems, in the display device of the present invention, a gate pulse is supplied to each gate bus line from one predetermined end of the each gate bus line.

According to the above invention, in a display panel in which a phenomenon, such as a feed through phenomenon, relevant to a gate bus line occurs with a symmetrical magnitude distribution about the longitudinal center line, a display quality can be improved by gray scale correction that is performed so that the phenomenon is compensated.

In order to solve the above problems, in the display device of the present invention, the correction amount corresponds to a scale of a feed-through voltage corresponding to the position of the each column.

According to the above invention, it is possible to improve a display quality while compensating an in-plane distribution of a feed through voltage.

In order to solve the above problems, in the display device of the present invention: the correction amount corresponding to a position of a part of the columns is stored in a lookup table; the gray scale correction is carried out on the gray scale data corresponding to the position of the part of the columns, by using, as the correction amount, a value stored in the lookup table; and the gray scale correction is carried out on the gray scale data corresponding to a position of other column, by obtaining the correction amount by an interpolation operation with use of the value stored in the lookup table.

According to the above invention, it is possible to reduce the number of correction amount values stored in the lookup table. Therefore, it becomes possible to reduce a size of the display device.

In order to solve the above problems, a method of the present invention for driving a display device of an active matrix type, the method includes the step of: carrying out gray scale correction on gray scale data to be converted into a data signal, by use of a correction amount corresponding to a position of each column to which the data signal is to be supplied, the each column being on a display panel, the step of carrying out the gray scale correction being performed by setting the correction amount to zero for at least (i) gray scale data corresponding to a lowest positive-polarity data signal potential and (ii) gray scale data corresponding to a highest negative-polarity data signal potential of first gray scale data to be supplied to at least one column constituting a part of all columns, the gray scale data (i) and (ii) being among the gray scale data provided for the gray scale correction.

According to the above invention, the gray scale correction is carried out on lowest positive-polarity gray scale data and lowest negative-polarity gray scale data for a position of at least one column constituting a part of all columns, by setting a correction amount to zero. That is, for the above-described data, the correction section outputs gray scale data equal to input gray scale data. This makes it possible to widen a gray scale range that can be used for display in a whole panel including not only the position of the at least one column but also respective positions of other columns, as compared to a conventional gray scale range that can be used for display in a whole panel.

As a result, it becomes possible to realize a method for driving a display device capable of ensuring a wide reproduction range while compensating, by correction of gray scale data, a phenomenon, such as a feed through phenomenon, in which an in-plane distribution in picture element electrode potential occurs.

In order to solve the above problems, in the method of the present invention: the gray scale correction is carried out by setting the correction amount to zero for at least (i) gray scale data corresponding to a lowest positive-polarity data signal potential and (ii) gray scale data corresponding to a lowest negative-polarity data signal potential of first gray scale data to be supplied to at least one column positioned at a center out of all the columns, the gray scale data (i) and (ii) being among the gray scale data provided for the gray scale correction.

According to the above invention, the gray scale correction is carried out on lowest positive-polarity gray scale data and lowest negative-polarity gray scale data for a position of at least one column positioned at the center among all columns, by setting a correction amount to zero. That is, for the above-described data, the correction section outputs gray scale data equal to input gray scale data. This makes it possible to widen a gray scale range that can be used for display in a whole panel including not only the position of the column at the center but also respective positions of other columns, as compared to a conventional gray scale range that can be used for display in a whole panel.

As a result, it becomes possible to realize a method for driving a display device capable of ensuring a wide reproduction range while compensating, by correction of gray scale data, a phenomenon, such as a feed through phenomenon, in which an in-plane distribution in picture element electrode potential occurs.

In order to solve the above problems, in the method of the present invention: a highest positive-polarity data signal potential corresponding to the first gray scale data after the gray scale correction is lower than a highest positive-polarity data signal potential corresponding to the gray scale data other than the first gray scale data after the gray scale correction; and a highest negative-polarity data signal potential corresponding to the first gray scale data after the gray scale correction is lower than a highest negative-polarity data signal potential corresponding to the gray scale data other than the first gray scale data after the gray scale correction.

According to the above invention, in the whole panel, identical gray scale data supplied for the gray scale correction is supplied as an identical data signal potential to a picture element electrode. In addition, positive-polarity gray scale data and negative-polarity gray scale data which have an identical gray scale level have equal effective voltage values to be applied to display elements such as liquid crystal display elements. This makes it possible to provide uniform display quality all over the panel.

In order to solve the above problems, in the method of the present invention: for all the columns, the gray scale correction is carried out by setting the correction amount to zero for gray scale data corresponding to a highest positive-polarity data signal potential; and for all the columns, the gray scale correction is carried out by setting the correction amount to zero for gray scale data corresponding to a highest negative-polarity data signal potential.

According to the above invention, a full gray scale range can be used for display at a position of a certain column. This makes it possible to provide a high display quality.

In order to solve the above problems, in the method of the present invention: for all the columns, the gray scale correction is carried out by setting the correction amount to zero for gray scale data corresponding to a highest positive-polarity data signal potential; and the gray scale correction is carried out so that a highest negative-polarity data signal potential corresponding to the first gray scale data after the gray scale correction becomes higher than a highest negative-polarity potential corresponding to the gray scale data other than the first gray scale data after the gray scale correction.

According to the above invention, a full gray scale range can be used for display at a position of a certain column. This makes it possible to provide a high display quality. Further, at a position of each column, it is possible to arrange so that a difference between a common electrode potential and a picture element electrode potential corresponding to corrected positive-polarity gray scale data is equal to a difference between the common electrode potential and a picture element electrode potential corresponding to corrected negative-polarity gray scale data. This makes it possible to provide a high display quality.

In order to solve the above problems, a method of the present invention for driving a display device of an active matrix type, the method includes the step of: carrying out gray scale correction on gray scale data to be converted into a data signal, by use of a correction amount corresponding to a position of each column to which the data signal is supplied, the each column being on a display panel, the gray scale correction is carried out by setting the correction amount to zero for (i) gray scale data corresponding a lowest positive-polarity data signal potential, (ii) gray scale data corresponding to a lowest negative-polarity data signal potential, (iii) gray scale data corresponding to a highest positive-polarity data signal potential, and (iv) gray scale data corresponding to a highest negative-polarity data signal potential for all the columns, the gray scale data (i), (ii), (iii), and (iv) being among the gray scale data supplied for the gray scale correction.

According to the above invention, the correction section carries out gray scale correction on lowest positive-polarity gray scale data, highest positive-polarity gray scale data, lowest negative-polarity gray scale data and highest negative-polarity gray scale data for respective positions of all columns, by setting a correction amount to zero. That is, for the above-described data, the correction section outputs gray scale data equal to input gray scale data. This makes it possible to widen a gray scale range that can be used for display in a whole panel, as compared to a conventional gray scale range that can be used for display in a whole panel.

As a result, it becomes possible to realize a display device capable of ensuring a wide reproduction range while compensating, by correction of gray scale data, a phenomenon, such as a feed through phenomenon, in which an in-plane distribution in picture element electrode potential occurs.

In order to solve the above problems, in the method of the present invention, the gray scale data to be converted into the data signal is gray scale data to be supplied to a display driver.

According to the above invention, even in a case where a display driver does not have a function to carry out gray scale correction, it is possible to carry out gray scale correction in a circuit of a preceding stage such as a display controller.

In order to solve the above problems, in the method of the present invention, a gate pulse is supplied to each gate bus line from each of both ends of the each gate bus line.

According to the above invention, in a display panel in which a phenomenon, such as a feed through phenomenon, relevant to a gate bus line occurs and causes a symmetrical distribution, a display quality can be improved by gray scale correction that is performed so that the phenomenon is compensated.

In order to solve the above problems, in the method of the present invention, a gate pulse is supplied to each gate bus line from one end of the each gate bus line.

According to the above invention, in a display panel in which a phenomenon, such as a feed through phenomenon, relevant to a gate bus line occurs and causes a symmetrical distribution, a display quality can be improved by gray scale correction that is performed so that the phenomenon is compensated.

In order to solve the above problems, in the method of the present invention, the correction amount corresponds to a scale of a feed-through voltage corresponding to the position of the each column.

According to the above invention, it is possible to improve a display quality while compensating an in-plane distribution of a feed through voltage.

In order to solve the above problems, in the method of the present invention: the correction amount corresponding to a position of a part of the columns is stored in a lookup table; the gray scale correction is carried out on the gray scale data corresponding to the position of the part of the columns, by using, as the correction amount, a value stored in the lookup table; and the gray scale correction is carried out on the gray scale data corresponding to a position of other column, by obtaining the correction amount by an interpolation operation with use of the value stored in the lookup table.

According to the above invention, it is possible to reduce the number of correction amount values stored in the lookup table. Therefore, it becomes possible to reduce a size of the display device.

Advantageous Effects of Invention

As described above, a display device of an active matrix type according to the present invention includes: a correction section for carrying out gray scale correction on gray scale data to be converted into a data signal, by use of a correction amount corresponding to a position of each column to which the data signal is to be supplied, the each column being on a display panel, the correction section carrying out the gray scale correction by setting the correction amount to zero for at least (i) gray scale data corresponding to a lowest positive-polarity data signal potential and (ii) gray scale data corresponding to a lowest negative-polarity data signal potential of first gray scale data to be supplied to at least one column constituting a part of all columns, the gray scale data (i) and (ii) being among the gray scale data inputted.

In the above arrangement, it is possible to realize a display device capable of ensuring a wide reproduction range while compensating, by correction of gray scale data, a phenomenon, such as a feed through phenomenon, in which an in-plane distribution occurs in picture element electrode potential.

As described above, a method of the present invention for driving a display device of an active matrix type, the method includes the step of: carrying out gray scale correction on gray scale data to be converted into a data signal, by use of a correction amount corresponding to a position of each column to which the data signal is to be supplied, the each column being on a display panel, the step of carrying out the gray scale correction being performed by setting the correction amount to zero for at least (i) gray scale data corresponding to a lowest positive-polarity data signal potential and (ii) gray scale data corresponding to a highest negative-polarity data signal potential of first gray scale data to be supplied to at least one column constituting a part of all columns, the gray scale data (i) and (ii) being among the gray scale data provided for the gray scale correction.

In the above arrangement, it is possible to realize a display device capable of ensuring a wide reproduction range while compensating, by correction of gray scale data, a phenomenon, such as a feed through phenomenon, in which an in-plane distribution occurs in picture element electrode potential.

BRIEF DESCRIPTION OF DRAWINGS

FIG. 12 is a diagram illustrating a configuration of a lookup table used for compensation of the feed through phenomenon of FIG. 11.

DESCRIPTION OF EMBODIMENTS

The following explains an embodiment of the present invention with reference to FIGS. 1 to 7.

Figure 1:
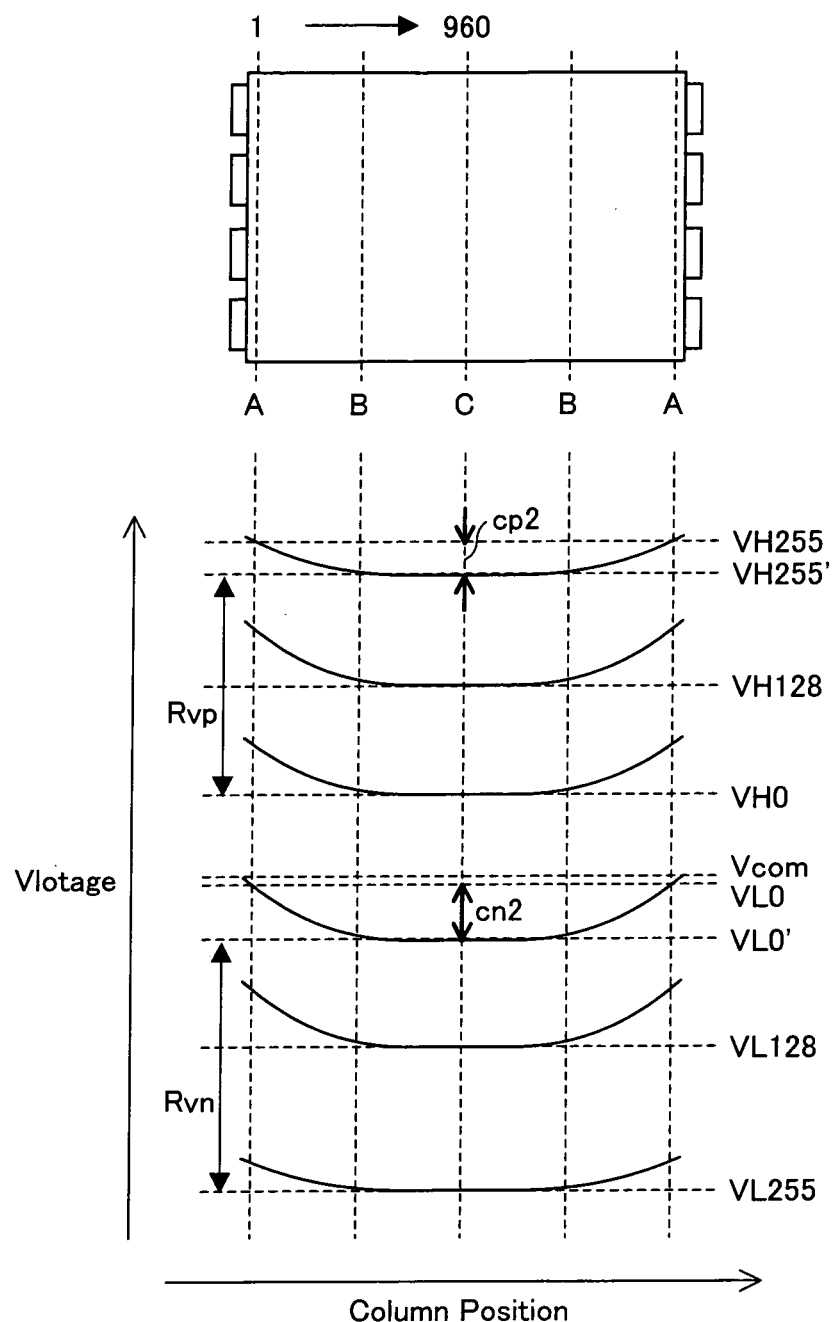
FIG. 1 illustrates an embodiment of the present invention and is a diagram illustrating a first method for compensating an in-plane distribution of a feed through phenomenon.
Figure 5:
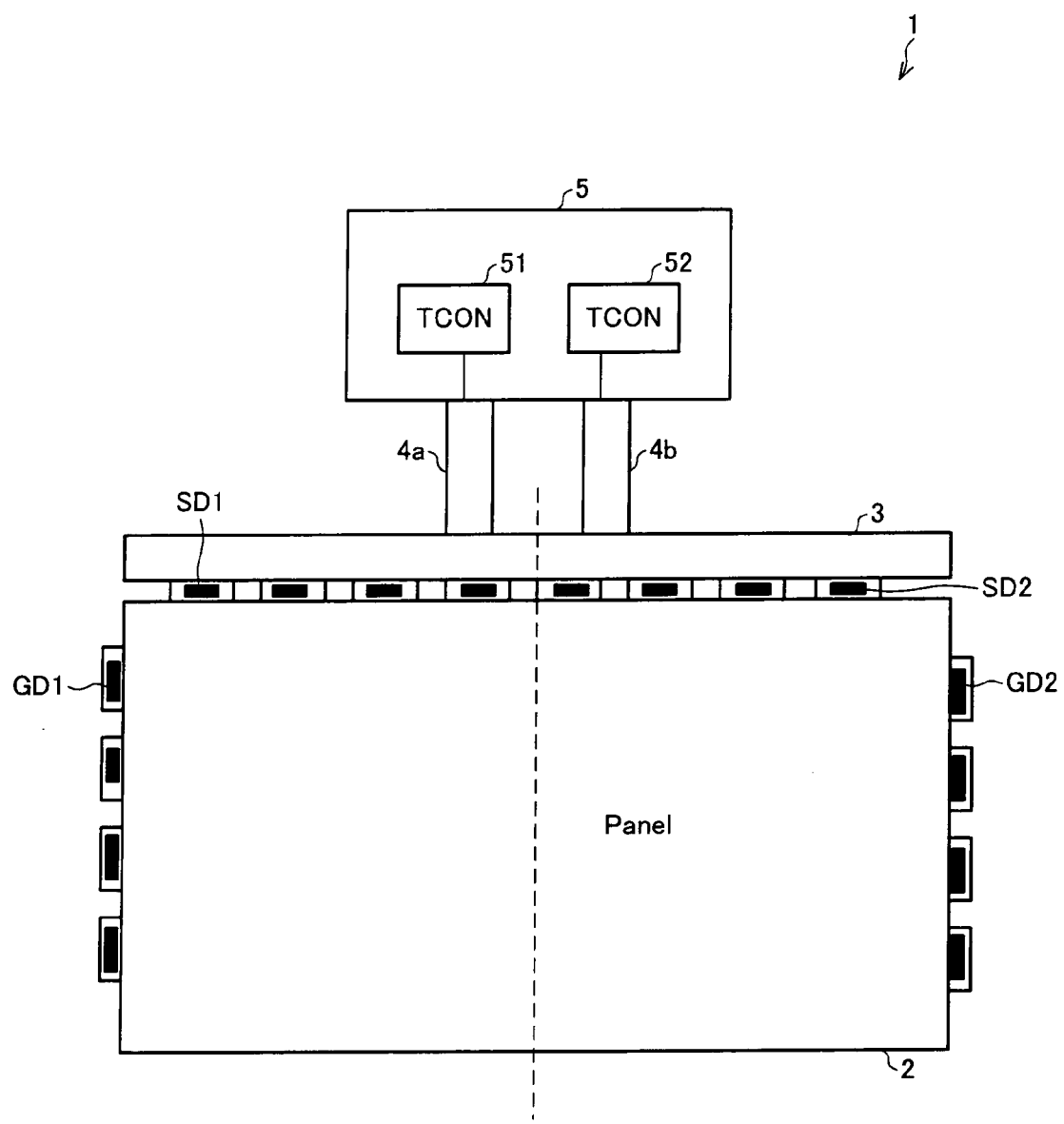
FIG. 5 illustrates an embodiment of the present invention and is a circuit block diagram illustrating a configuration of a display device that performs the methods of FIGS. 1 to 4.

FIG. 5 illustrates a configuration of a liquid crystal display device (display device) 1 of the present embodiment. As shown in FIG. 1, the liquid crystal display device 1 is an active matrix display device including a display panel 2, an SOF board 3, a plurality of source drivers (display drivers) SD1 . . . and SD2 . . . , a plurality of gate drivers GD1 . . . and GD2 . . . , flexible wires 4a and 4b, and a display controller 5. Note that any disposition of the above members is possible. That is, any combination of the display panel 2 and other members may be mounted on one panel. Alternatively, a part or all of the plurality of source drivers SD1 . . . and SD2 . . . , the plurality of gate drivers GD1 . . . and GD2 . . . , and the display controller 5 may be mounted on an external board such as a flexible printed board and connected to a panel including the display panel 2.

Figure 6:
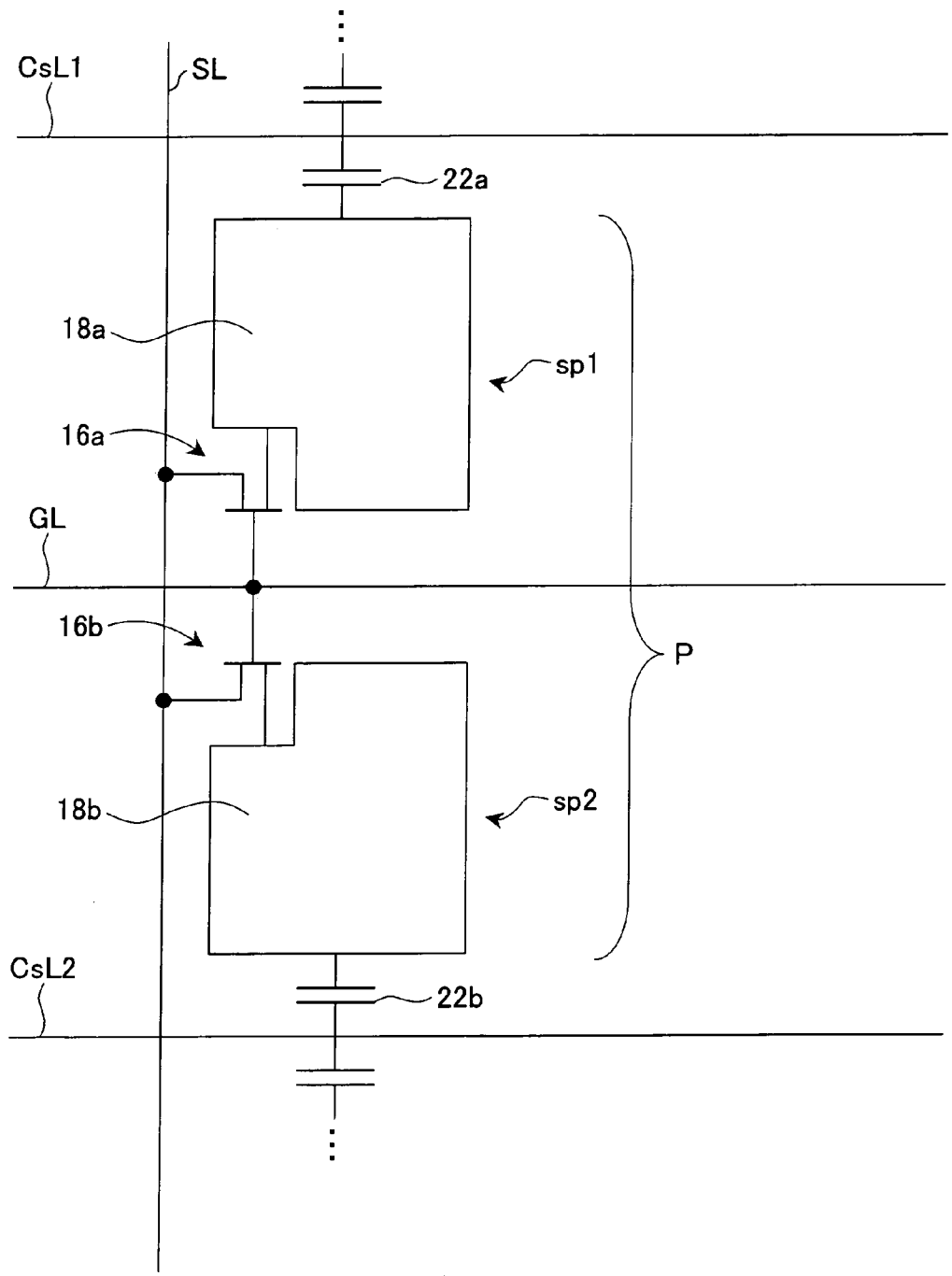
FIG. 6 is a plan view illustrating an exemplary configuration of a picture element in the display device of FIG. 5.

FIG. 6 shows an exemplary configuration of each picture element P provided in the display panel 2. Here, the picture element P has a picture element configuration of a multi-picture-element drive method that improves viewing angle dependency of a γ characteristic in the display device. However, the configuration of the picture element is not limited to this but may adopt any configuration. In the multi-picture-element drive, one picture element is formed by two or more sub-picture elements that have different luminances, respectively. This improves a viewing angle characteristic or the viewing angle dependency of the γ characteristic.

One picture element 2 is divided into sub-picture elements sp1 and sp2. The sub-picture element sp1 includes a TFT 16a, a sub-picture element electrode 18a, and a storage capacitor 22a, and the sub-picture element sp2 includes a TFT 16b, a sub-picture element electrode 18b, and a storage capacitor 22b.

The TFTs 16a and 16b have respective gate electrodes connected to a common gate bus line GL and respective source electrodes connected to a common source bus line SL. The storage capacitance 22a is formed between the sub-picture element electrode 18a and a storage capacitor bus line CsL1, and the storage capacitor 22b is formed between the sub-picture element electrode 18b and a storage capacitor bus line CsL2. The storage capacitor bus line CsL1 is provided so that an area of the sub-picture element sp1 is between the storage capacitor bus line CsL1 and the gate bus line GL and the storage capacitor bus line CsL1 extends in parallel to the gate bus line GL. Meanwhile, the storage capacitor bus line CsL2 is provided so that an area of the sub-picture element sp2 is between the storage capacitor bus line CsL2 and the gate bus line GL and the storage capacitor bus line CsL2 extends in parallel to the gate bus line GL.

Further, the storage capacitor bus line CsL1 of each picture element P also serves as a storage capacitor bus line CsL2 that allows a sub-picture element sp2 of another picture element P that is adjacent to the picture element P via the storage capacitor bus line CsL1 to form a storage capacitor 22b. Further, the storage capacitor bus line CsL2 of each picture element P also serves as a storage capacitor bus line CsL1 that allows a sub-picture element sp1 of still another picture element P that is adjacent to the picture element P via the storage capacitor bus line CsL2 to form a storage capacitor 22a.

Both the sub-picture elements sp1 and sp2 are connected to one source bus line SL and further both the TFTs 16a and 16b are connected to one gate bus line GL. Accordingly, it is considered that the same data signals, that is, the same gray scale data is supplied to the sub-picture elements sp1 and sp2. This gray scale data corresponds to a luminance of the picture element P as a whole which luminance is obtained as a total result of contributions of the sub-picture elements sp1 and sp2.

In FIG. 5, the source drivers SD1 . . . and SD2 . . . and the gate drivers GD1 . . . and GD2 . . . are connected to the display panel 2 in the form of an SOF (System On Film) package. Here, the source drivers SD1 . . . and SD2 . . . are connected to only one side of the display panel 2. The source drivers SD1 . . . supply data signals to source bus lines SL . . . on a left half of the display panel 2 on a sheet of drawing, and the source drivers SD2 . . . supplies data signals to source bus lines SL . . . on a right half of the display panel on the sheet of drawing. To a side on a left side of the sheet of drawing which side is orthogonal to the side to which the source drivers SD1 . . . and SD2 . . . are connected, the gate drivers GD1 . . . are connected. Meanwhile, to a side on a right side of the sheet of drawing which side is orthogonal to the side to which the source drivers SD1 . . . and SD2 . . . are connected, the gate drivers GD2 . . . are connected. However, disposition of the source drivers SD1 . . . and SD2 . . . and the gate drivers GD1 . . . and GD2 . . . is not limited to the one described above. Further, the source drivers SD1 . . . and SD2 . . . are connected to the SOF board 3. To each source driver, corresponding gray scale data is supplied from the SOF board 3.

The SOF board 3 is connected to the display controller 5 via the flexible wires 4a and 4b. The flexible wires 4a includes a connecting line to the source drivers SD1 . . . and the gate drivers GD1 .... Meanwhile, the flexible wires 4b includes a connecting line to the source drivers SD2 ... and the gate drivers GD2 .... The display controller 5 includes timing controllers 51 and 52 and supplies timing signals used by the source drivers SD1 ... and SD2 ... and the gate drivers GD1 ... and GD2 ..., gray scale data used by the source drivers SD1 ... and SD2 ... and storage capacitor voltages used by the storage capacitor bus lines CsL1 and CsL2. Timing signals and storage capacitor voltages used by the gate drivers GD1 ... and GD2 ... are supplied into the display panel 2 via the SOF board 3 and the SOF package of the source drivers SD1 ... and SD2 .... Note that the timing controllers 51 and 52 may be integrated as one unit and sorting of gray scale data for supply to the left and right sides of the panel may be performed in any circuit block provided in the display controller 5.

Figure 7:
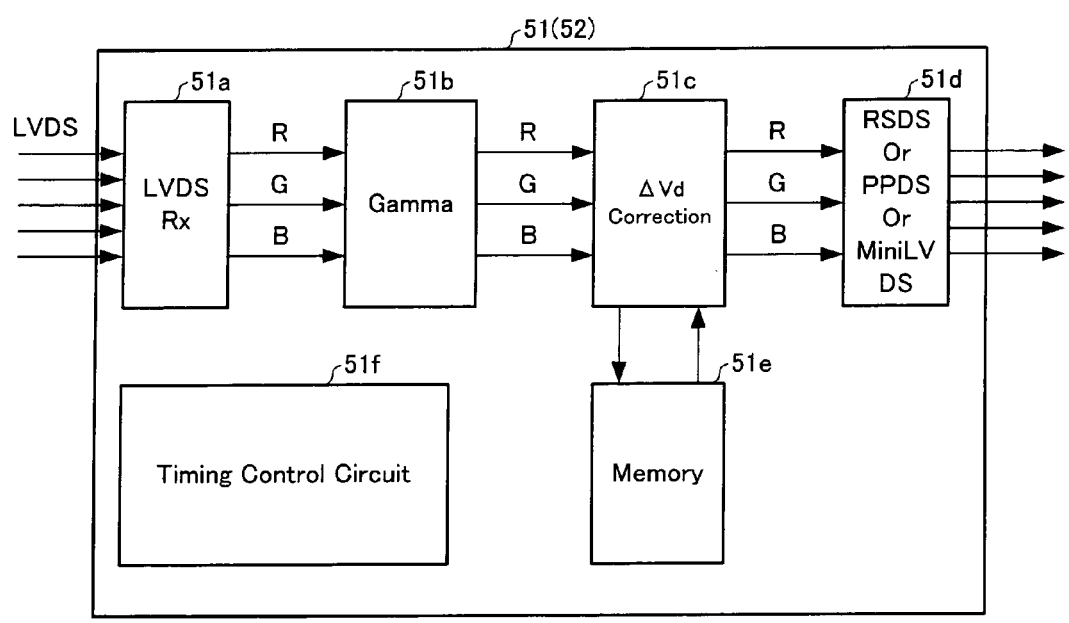
FIG. 7 is a block diagram illustrating a configuration of a timing controller of a display controller included in the display device of FIG. 5.
Figure 8:
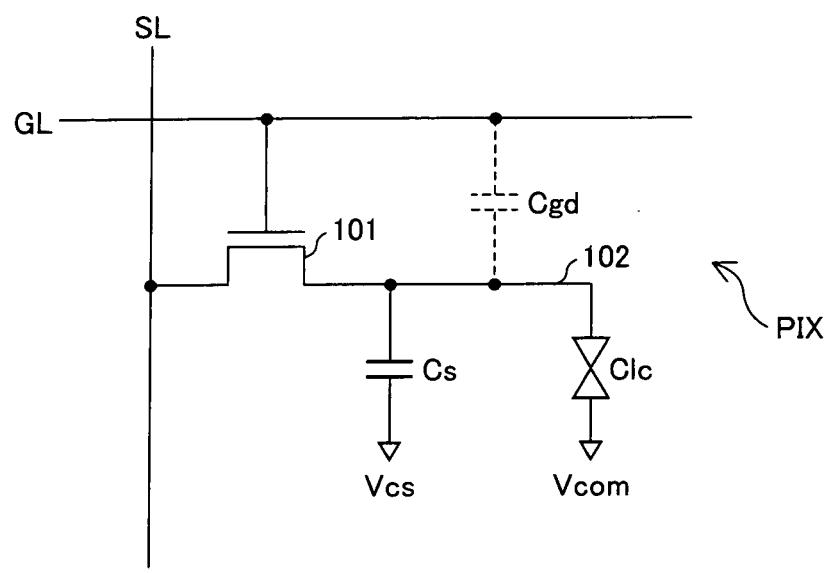
FIG. 8 illustrates a conventional technique and is a circuit diagram showing a configuration of a picture element in the form of an equivalent circuit.
Figure 9:
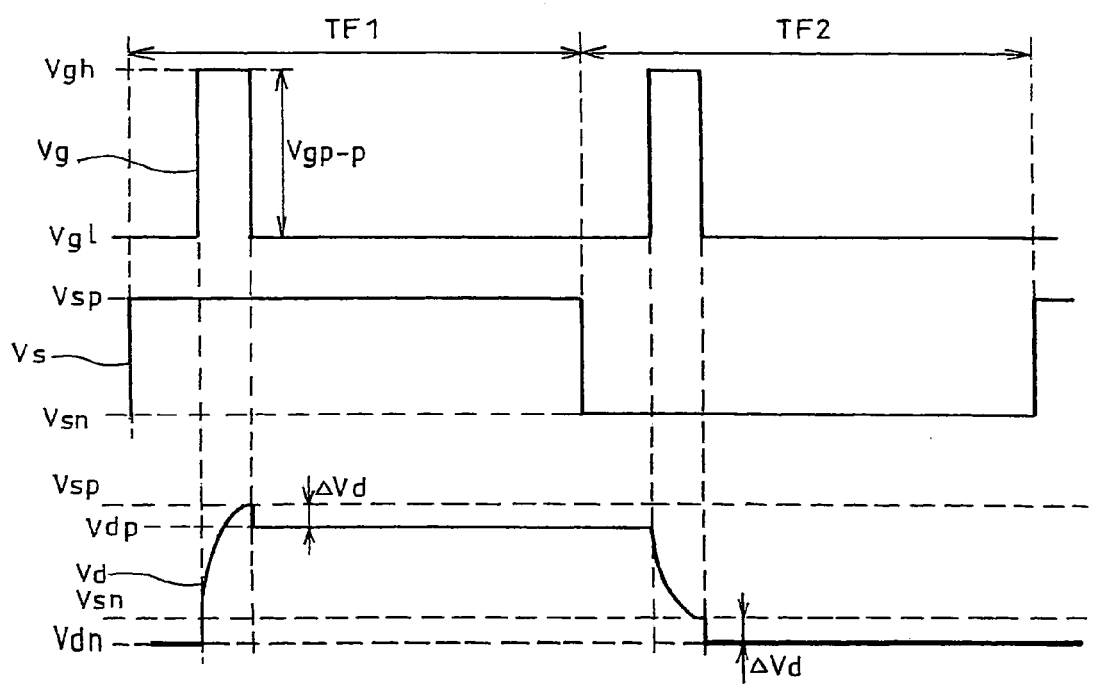
FIG. 9 is a potential waveform chart illustrating a feed through phenomenon of the picture element of FIG. 8.
Figure 10:
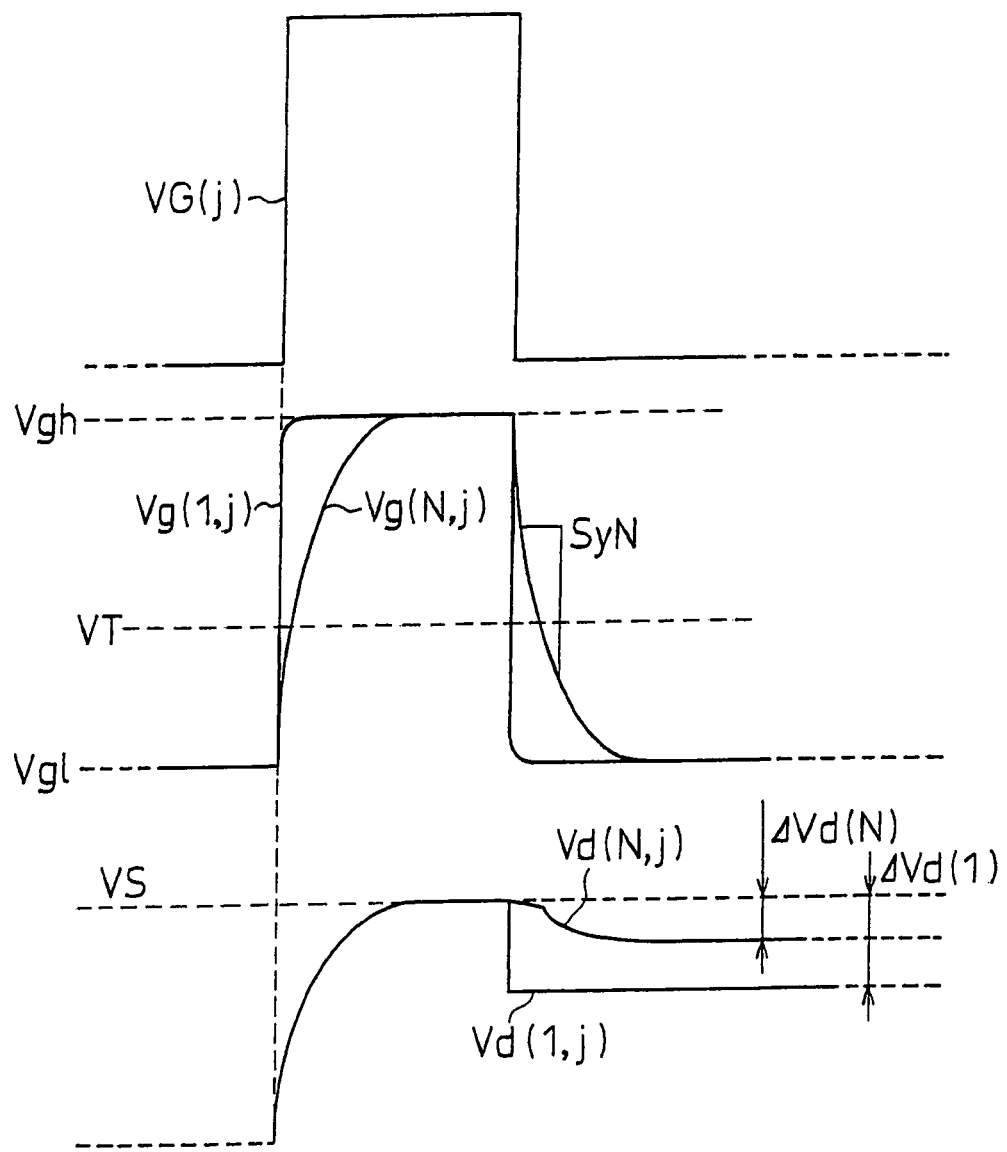
FIG. 10 is a potential waveform chart illustrating that the feed through phenomenon of FIG. 9 has a certain distribution within a plane of a panel.
Figure 11:
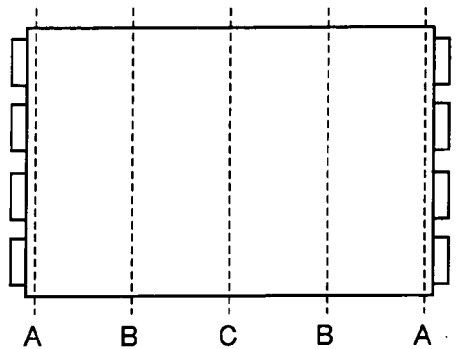
FIG. 11 is a diagram illustrating a method for compensating an in-plane distribution of the feed through phenomenon of FIG. 10; (a) is a plan view illustrating an exemplary configuration of a panel assumed; (b) is a graph illustrating in-plane distributions of feed through voltages and picture element electrode potentials; and (c) is a graph illustrating a correction amount distribution of gray scale data used for compensating the feed through voltages.
Figure 11:
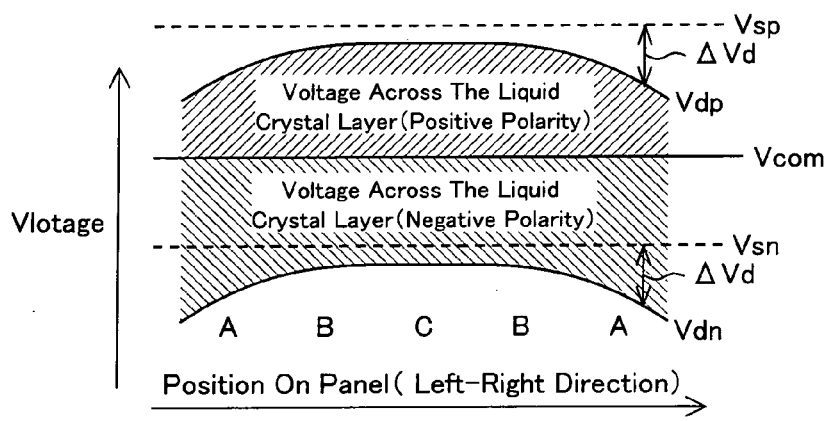
Figure 11:
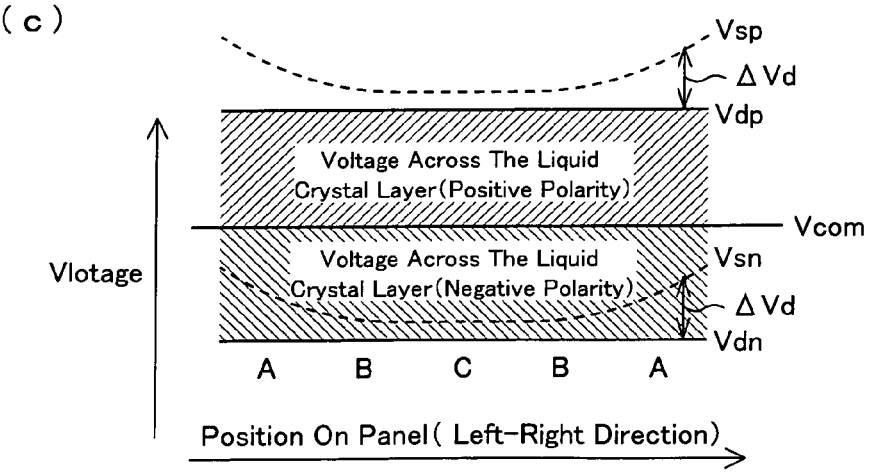

FIG. 7 shows a configuration of the timing controllers 51 and 52. The timing controllers 51 and 52 have an identical configuration. Therefore, this embodiment explains only the timing controller 51. Note that the timing controller 51 performs processing on signals, data, storage capacitor voltages and the like for the source drivers SD1 ... and the gate drivers GD1 ... on the left half side of the display panel 2 on the sheet of drawing, and the timing controller 52 performs processing on signals, data, storage capacitor voltages and the like for the source drivers SD2 ... and the gate drivers GD2 on the right half side of the display panel 2 on the sheet of drawing.

The timing controller 51 includes an LVDS receiver 51a, a gamma correction section 51b, a ΔVd correction section 51c, a data transmission driver 51d, a memory 51e, and a timing control circuit 51f.

The LDVS receiver 51a receives RGB display data outputted from an LVDS driver. The gamma correction section 51b performs gamma correction on the RGB display data received from the LVDS receiver 51a. The ΔVd correction section 51c performs gray scale correction on the RGB gray scale data inputted from the gamma correction section 51b. This gray scale correction is performed in accordance with a position of a column to which gray scale data is to be supplied, with reference to a lookup table stored in the memory 51e. The data transmission driver 51d converts the RGB gray scale data outputted from the ΔVd correction section 51c to serial data, such as RSDS (Reduced Swing Differential Signaling), PPDS (Point To Point Differential Signaling), or MiniLVDS, suitable for transmission to the display panel 2.

The timing control circuit 51f generates and outputs timing signals such as clock signals and start pulse signals that are used by the source drivers and the gate drivers.

Next, the following explains in detail the gray scale correction carried out by the ΔVd correction section 51c.

In the present embodiment, the ΔVd correction section 51c carries out gray scale correction so that a correction amount is 0 for the lowest positive gray scale data and the lowest negative gray scale data at a center section C of the panel. That is, the ΔVd correction section 51c outputs gray scale data that is equal to input gray scale data, for the lowest positive gray scale data and the lowest negative gray scale data. This makes it possible to have a wider gray scale range that can be used for display in a whole panel including not only the center section C of the panel but also end sections A and intermediate sections B of the panel, as compared to a conventional gray scale range that can be used for display in a whole panel.

The following explains this by using some Examples.

EXAMPLE 1

FIG. 1 is a diagram illustrating gray scale correction related to Example 1. In the graph, what are indicated by a vertical axis and a horizontal axis are the same as in FIG. 13.

In FIG. 1, it is desired that the lowest positive gray scale data is set to have a picture element electrode potential that is uniform in a plane after a feed through phenomenon occurs. However, with respect to input gray scale data "0", correction is carried out so that a correction amount is 0, that is, a data signal potential becomes VH0 at a position of a column at the center section C of the panel. In an area from the center section C to the center sections C through the intermediate sections B, each value of the gray scale data is increased in the correction by adding only a correction amount corresponding to a difference in voltage ΔVd from a voltage ΔVd of the center section C of the panel which difference corresponds to a position of each column. In this case, the picture element electrode potential after the occurrence of the feed through phenomenon is lower by the voltage ΔVd of the center section C of the panel, as compared to VH0.

Further, regarding the highest positive gray scale data, for setting the picture element electrode potential after the occurrence of the feed through phenomenon to be a value that is as high as possible as well as making this picture element electrode potential uniform in a plane, the gray scale data at the end sections A of the panel is corrected to "255" as in the conventional case. This correction is made, while a gray scale level at the center section C of the panel is kept to be lower than those at the end sections A of the panel by cp2 that is the same as a difference in input gray scale level and the gray scale level at the center section C of the panel is kept lower than those at the intermediate sections B of the panel by a corresponding input gray scale level difference. In this case, the gray scale data of the center section C of the panel after the correction becomes "255'" that is lower than "255". As a result, the picture element electrode potential corresponding to the highest gray scale data after the occurrence of the feed through phenomenon uniformly becomes a value that is uniformly lower by the voltage ΔVd than "255'" in the plane.

It is desired that the highest negative gray scale data is set to have a picture element electrode potential that is uniform in a plane after the feed through phenomenon occurs. However, with respect to input gray scale data "255", correction is carried out so that a correction amount is 0, that is, a data signal potential becomes VL255 at a position of a column at the center section C of the panel. In an area from the center section C to the center section C through the intermediate sections B of the panel, a value of the gray scale data is decreased in the correction by subtracting only a correction amount corresponding to a difference in voltage ΔVd from a voltage ΔVd of the center section C of the panel which difference corresponds to a position of each column. In this case, the picture element electrode potential after the occurrence of the feed through phenomenon is lower by the voltage ΔVd of the center section C of the panel, as compared to VL255.

Further, regarding the lowest negative gray scale data, for setting the picture element electrode potential after the occurrence of the feed through phenomenon to be a value that is as high as possible as well as making this picture element electrode potential uniform in a plane, the gray scale data at the end sections A of the panel is corrected to "0" as in the conventional case. This correction is made, while a gray scale level at the center section C of the panel is lower than those at the end sections A of the panel by cp2 that is the same as an input gray scale level difference and the gray scale level at the center section C of the panel is kept lower than those at the intermediate sections B of the panel by a corresponding input gray scale level difference. In this case, the gray scale data of the center section C of the panel after the correction becomes "0'" that is lower than "0". As a result, the picture element electrode potential corresponding to the highest gray scale data after the occurrence of the feed through phenomenon uniformly becomes a value that is uniformly lower by the voltage ΔVd than "0'" in the plane.

Further, the common electrode potential Vcom is set to a potential that has a center value between a potential that is lower than the potential VH0 by the voltage ΔVd at the center section C of the panel, and a potential that is lower than the potential VL0' by the voltage ΔVd at the center section C of the panel. Further, in the present example, this common electrode voltage Vcom is a potential whose value is a center value between (i) a potential that is lower, by a voltage ΔVd at a position of each column, than a data signal potential corresponding to positive gray scale data and (ii) a potential that is lower, by the voltage ΔVd at the position of each column, than a data signal potential corresponding to negative gray scale data, in a case where the positive gray scale data and the negative gray scale data whose gray scale levels are the same are focused at the position of each column on the whole panel.

As a result of this gray scale correction, an output gray scale range that can be displayed by the picture element PIX at the center section C of the panel after the occurrence of the feed through voltage is a gray scale range Rvp that corresponds to voltages corresponding to potentials from the potential VH255' to the potential VH0 in regard to the positive gray scale data, and a gray scale range Rvn that corresponds to voltages corresponding to potentials from the potential VL0' to the potential VL255 in regard to the negative gray scale data. Note that gray scale gradients in each of the gray scale ranges Rvp and Rvn are designed as appropriate.

Figure 13:
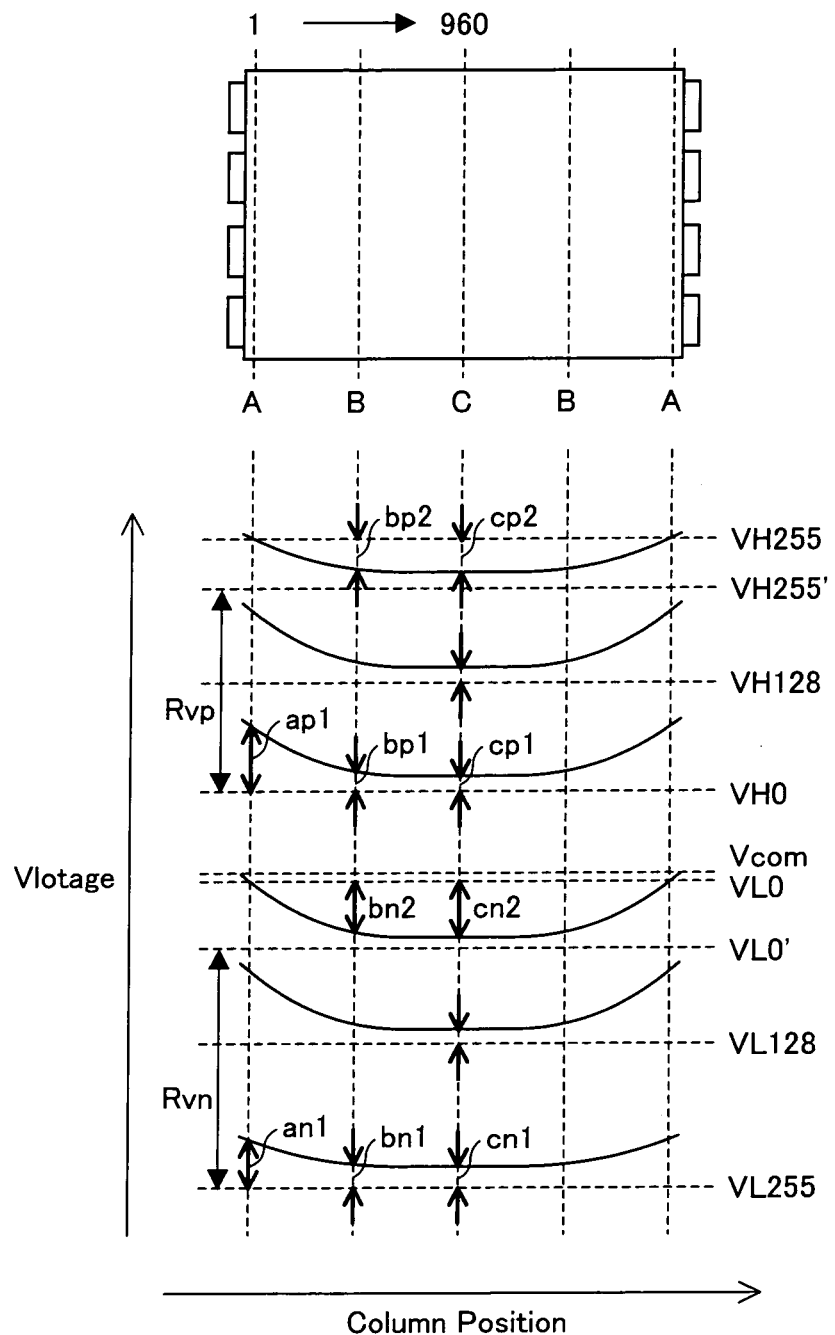
FIG. 13 is a diagram illustrating a defect of a conventional method for compensating a feed through phenomenon.

In comparison of these gray scale ranges Rvp and Rvn with those of FIG. 13, the lowest positive gray scale data after correction at the center section C of the panel in FIG. 13 is higher by cp1 than that in FIG. 1 and accordingly, the lowest positive gray scale data that is equal to ap1 at the end sections A of the panel and the lowest positive gray scale data that is equal to bp1 at the intermediate sections B of the panel are also higher than those in FIG. 1. Characteristics of this positive gray scale data also applies to the negative gray scale data. In conclusion, the gray scale ranges Rvp and Rvn become wider in FIG. 1 than in FIG. 13 all over the panel. In particular, it means to widen a reproduction range at the center section of the display panel that the gray scale ranges Rvp and Rvn at the center section C of the panel become wider than conventional ranges. Therefore, this significantly contributes to improvement in display quality.

The following explains a specific example of gray scale correction for compensating the voltage ΔVd in accordance with a position of a column, by using lookup tables that are provided inside the memory 51e and that store relations between the input gray scale data and corrected gray scale data. Table 3 shows a lookup table for the positive gray scale data. Meanwhile, Table 4 shows a lookup table for the negative gray scale data.

TABLE 3

| Input Gray Scale | Corrected Gray Scale Level Corresponding To Column Position | | | | | | |
|---|---|---|---|---|---|---|---|
| Level | (End) 1 | 96 | 192 | 288 | 384 | 576 | 768 | (Center) 960 |
| 0 | 4 | 4 | 3 | 3 | 3 | 2 | 0 | 0 |
| 8 | 10 | 9 | 9 | 9 | 8 | 8 | 8 | 8 |
| 16 | 21 | 19 | 19 | 19 | 18 | 17 | 17 | 16 |
| 24 | 37 | 33 | 32 | 31 | 30 | 27 | 26 | 24 |
| 32 | 67 | 52 | 50 | 49 | 45 | 38 | 36 | 32 |
| 40 | 98 | 78 | 76 | 72 | 64 | 54 | 47 | 40 |
| 48 | 119 | 97 | 94 | 91 | 80 | 68 | 59 | 48 |

TABLE 3-continued

| Input Gray Scale | Corrected Gray Scale Level Corresponding To Column Position | | | | | | |
|---|---|---|---|---|---|---|---|
| Level | (End) 1 | 96 | 192 | 288 | 384 | 576 | 768 | (Center) 960 |
| 64 | 147 | 123 | 120 | 116 | 107 | 92 | 80 | 64 |
| 96 | 184 | 163 | 159 | 155 | 145 | 129 | 114 | 96 |
| 128 | 223 | 196 | 193 | 189 | 179 | 163 | 149 | 128 |
| 192 | 300 | 273 | 267 | 263 | 251 | 231 | 216 | 192 |
| 256 | 364 | 339 | 334 | 330 | 317 | 298 | 281 | 256 |
| 320 | 409 | 394 | 390 | 386 | 377 | 358 | 343 | 320 |
| 384 | 444 | 430 | 428 | 426 | 420 | 409 | 401 | 384 |
| 448 | 503 | 488 | 487 | 484 | 477 | 468 | 460 | 448 |
| 512 | 575 | 558 | 556 | 553 | 547 | 535 | 526 | 512 |
| 576 | 637 | 622 | 619 | 617 | 610 | 600 | 590 | 576 |
| 640 | 701 | 684 | 681 | 678 | 673 | 662 | 654 | 640 |
| 704 | 766 | 752 | 750 | 747 | 740 | 728 | 719 | 704 |
| 768 | 808 | 801 | 801 | 799 | 796 | 788 | 781 | 768 |
| 832 | 854 | 849 | 848 | 847 | 845 | 840 | 837 | 832 |
| 864 | 883 | 878 | 877 | 877 | 874 | 871 | 869 | 864 |
| 896 | 910 | 906 | 906 | 905 | 904 | 901 | 899 | 896 |
| 928 | 938 | 935 | 935 | 934 | 933 | 931 | 930 | 928 |
| 960 | 966 | 964 | 964 | 964 | 963 | 962 | 961 | 960 |
| 992 | 1000 | 998 | 997 | 997 | 997 | 995 | 994 | 992 |
| 1023 | 1023 | 1020 | 1020 | 1020 | 1020 | 1019 | 1014 | 1012 |

TABLE 4

| Input Gray Scale | Corrected Gray Scale Level Corresponding To Column Position | | | | | | |
|---|---|---|---|---|---|---|---|
| Level | (End) 0 | 96 | 192 | 288 | 384 | 576 | 768 | (Center) 960 |
| 0 | 0 | 0 | 1 | 1 | 1 | 2 | 4 | 4 |
| 8 | 5 | 6 | 6 | 6 | 7 | 7 | 8 | 8 |
| 16 | 13 | 14 | 14 | 14 | 14 | 15 | 15 | 16 |
| 24 | 18 | 19 | 20 | 20 | 20 | 22 | 23 | 24 |
| 32 | 22 | 24 | 24 | 25 | 26 | 28 | 29 | 32 |
| 40 | 26 | 28 | 29 | 29 | 31 | 33 | 36 | 40 |
| 48 | 28 | 31 | 32 | 32 | 34 | 37 | 41 | 48 |
| 64 | 32 | 36 | 37 | 38 | 41 | 46 | 52 | 64 |
| 96 | 40 | 48 | 50 | 52 | 57 | 68 | 77 | 96 |
| 128 | 54 | 69 | 71 | 74 | 83 | 98 | 110 | 128 |
| 192 | 105 | 126 | 130 | 133 | 143 | 160 | 173 | 192 |
| 256 | 162 | 183 | 187 | 190 | 201 | 220 | 233 | 256 |
| 320 | 219 | 243 | 247 | 252 | 263 | 282 | 296 | 320 |
| 384 | 287 | 314 | 318 | 322 | 332 | 350 | 363 | 384 |
| 448 | 394 | 409 | 412 | 414 | 419 | 429 | 437 | 448 |
| 512 | 458 | 472 | 474 | 476 | 482 | 492 | 499 | 512 |
| 576 | 518 | 532 | 533 | 536 | 543 | 554 | 563 | 576 |
| 640 | 583 | 598 | 601 | 603 | 609 | 619 | 628 | 640 |
| 704 | 646 | 659 | 663 | 664 | 670 | 679 | 689 | 704 |
| 768 | 710 | 727 | 729 | 731 | 738 | 748 | 757 | 768 |
| 832 | 808 | 815 | 816 | 816 | 819 | 823 | 827 | 832 |
| 864 | 846 | 850 | 851 | 852 | 855 | 858 | 861 | 864 |
| 896 | 880 | 885 | 886 | 886 | 889 | 891 | 893 | 896 |
| 928 | 917 | 919 | 920 | 920 | 922 | 924 | 925 | 928 |
| 960 | 953 | 955 | 955 | 955 | 956 | 957 | 959 | 960 |
| 992 | 982 | 984 | 984 | 986 | 986 | 987 | 989 | 992 |
| 1023 | 1009 | 1012 | 1012 | 1012 | 1012 | 1013 | 1018 | 1023 |

In Tables 3 and 4, the number of bits for representing gray scale data and a resolution of the display panel are the same as in the case of Tables 1 and 2.

As shown in Table 3, regarding the positive gray scale data, due to the correction, no gray scale data is lost on the lowest gray scale level side at the center (corresponding to the center section C of the panel), while only 11 gray scale levels from "1013" to "1023" are lost on the highest gray scale level side at the center. Further, at edges (corresponding to the end sections A of the panel), only 4 gray scale levels from "0" to "3" are lost on the lowest gray scale level side.

Further, as shown in Table 4, regarding the negative gray scale data, due to the correction, only four gray scale levels from "0" to "3" are lost at the center (corresponding to the center section C of the panel), while no gray scale data is lost on the highest gray scale level side at the center. Further, at the edges (corresponding to the end sections A of the panel), only 14 gray scale levels from "1010" to "1023" are lost on the highest gray scale level side.

In this way, according to the present example, it is possible to realize a display device capable of ensuring a wide reproduction range by compensating an in-plane distribution of a feed through phenomenon by correction of gray scale data.

Further, according to the present example, all over the whole panel, identical gray scale data supplied to the ΔVd correction section 51c is supplied to picture element electrodes as an identical data signal potential. In addition, an effective value of a voltage across the liquid crystal layer of positive gray scale data become equal to that of negative gray scale data that has the identical gray scale level as the positive gray scale data. Therefore, it is possible to provide uniform display quality all over the panel.

EXAMPLE 2

Figure 2:
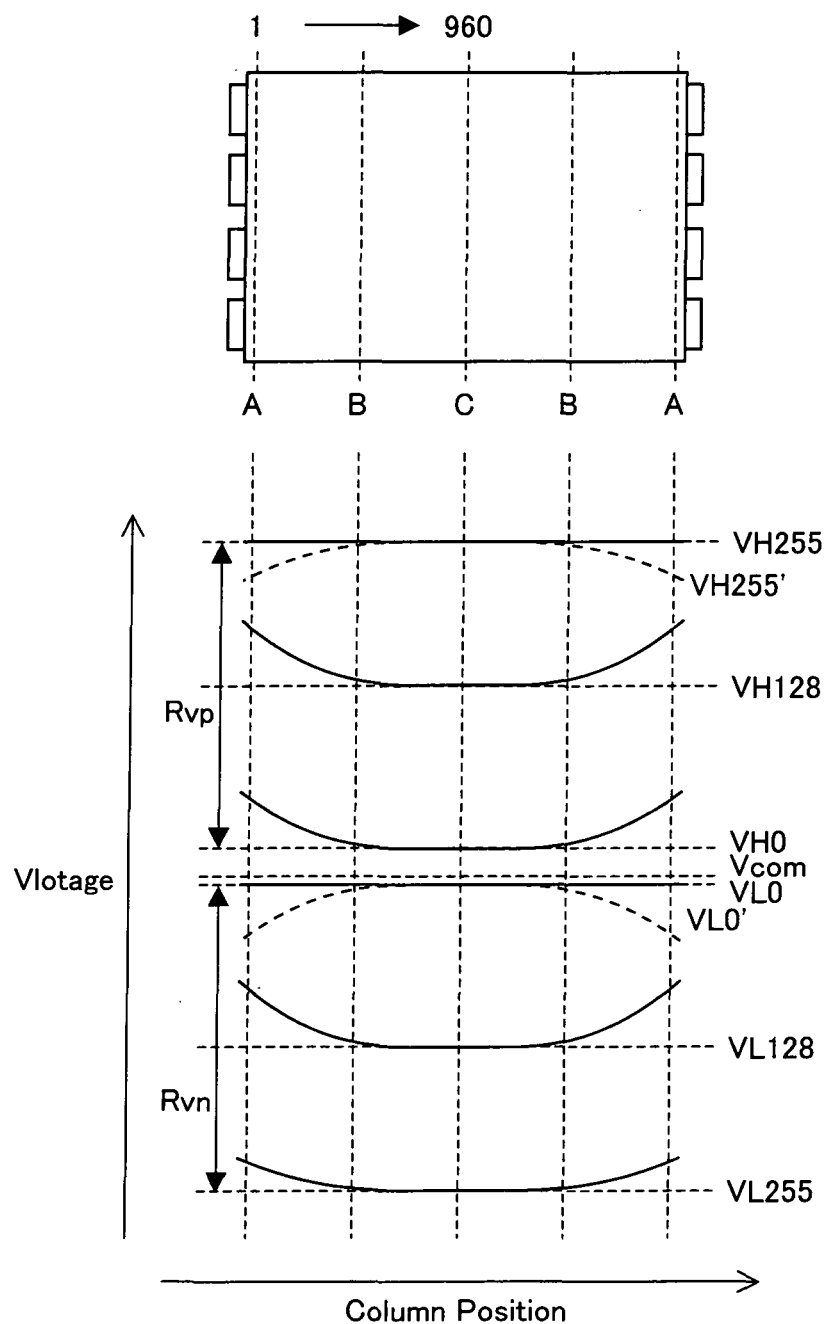
FIG. 2 illustrates an embodiment of the present invention and is a diagram illustrating a second method for compensating an in-plane distribution of a feed through phenomenon.

FIG. 2 is a diagram illustrating gray scale correction related to Example 2. In the graph, what are indicated by a vertical axis and a horizontal axis are the same as in FIG. 13.

In FIG. 2, it is desired that the lowest positive gray scale data is set to have a picture element electrode potential that is uniform in a plane after a feed through phenomenon occurs. However, with respect to input gray scale data "0", correction is carried out so that a correction amount is 0, that is, a data signal potential becomes VH0 at a position of a column at the center section C of the panel. In an area from the center section C to the center sections C through the intermediate sections B, each value of the gray scale data is increased in the correction by adding only a correction amount corresponding to a difference in voltage ΔVd from a voltage ΔVd of the center section C of the panel which difference corresponds to a position of each column. In this case, the picture element electrode potential after the occurrence of the feed through phenomenon is lower by the voltage ΔVd of the center section C of the panel, as compared to a potential corresponding to the lowest gray scale data at the position of each column.

Further, regarding the highest positive gray scale data, for setting the picture element electrode potential after the occurrence of the feed through phenomenon to be a value that is as high as possible at a position of each column in a condition where the picture element electrode potential is not uniform in a plane, the gray scale data at respective positions of all columns is corrected to "255". In this case, a correction amount for all the gray scale data at the center section C of the panel is 0. After the occurrence of the feed through phenomenon, the picture element electrode potential becomes a potential that is decreased by the voltage ΔVd at the center section C of the panel from a curve of VH255' that passes through a point of a potential VH255 at the center section C of the panel and that indicates a potential that is lower than VH255 by a difference in voltage ΔVd from the center section C of the panel which difference corresponds to a position of each column.

It is desired that the highest negative gray scale data is set to have a picture element electrode potential that is uniform in a plane after the feed through phenomenon occurs. However, with respect to input gray scale data "255", correction is carried out so that a correction amount is 0, that is, a data signal potential becomes VL255 at a position of a column at the center section C of the panel. In an area from the center section C to the end sections A through the intermediate sections B of the panel, a value of the gray scale data is decreased in the correction by subtracting only a correction amount corresponding to a difference in voltage ΔVd from a voltage ΔVd of the center section C of the panel which difference corresponds to a position of each column. In this case, the picture element electrode potential after the occurrence of the feed through phenomenon is lower by the voltage ΔVd of the center section C of the panel, as compared to a potential corresponding to the highest gray scale data at the position of each column.

Further, regarding the lowest negative gray scale data, for setting the picture element electrode potential after the occurrence of the feed through phenomenon to be a value that is as high as possible at a position of each column in a condition where the picture element electrode potential is not uniform in a plane, the gray scale data at respective positions of all columns is corrected to "0". In this case, a correction amount for all the gray scale data at the center section C of the panel is 0. After the occurrence of the feed through phenomenon, the picture element electrode potential becomes a potential that is decreased by the voltage ΔVd of the center section C of the panel from a curve of VL0' that passes through a point of a potential VL0 at the center section C of the panel and that indicates a potential that is lower than VL0 by a difference in voltage ΔVd from the center section C of the panel which difference corresponds to a position of each column.

Further, the common electrode potential Vcom is set to a potential that has a center value between a potential that is lower than the potential VH0 by the voltage ΔVd at the center section C of the panel, and a potential that is lower than the potential VL0' by the voltage ΔVd at the center section C of the panel. Further, in the present example, this common electrode voltage Vcom is a potential whose value is a center value between (i) a potential that is lower, by a voltage ΔVd at the center section C of the panel, than a data signal potential corresponding to positive gray scale data and (ii) a potential that is lower by the voltage ΔVd at the center section C of the panel, than a data signal potential corresponding to negative gray scale data, in a case where the positive gray scale data and the negative gray scale data whose gray scale levels are the same are focused at the center section C of the panel.

As a result of this gray scale correction, an output gray scale range that can be displayed by the picture element PIX at the center section C of the panel after the occurrence of the feed through voltage is a gray scale range Rvp that corresponds to voltages corresponding to potentials from the potential VH255 to the potential VH0 in regard to the positive gray scale data, and a gray scale range Rvn that corresponds to voltages corresponding to potentials from the potential VL0 to the potential VL255 in regard to the negative gray scale data. Note that gray scale gradients in each of the gray scale ranges Rvp and Rvn are designed as appropriate.

In comparison of these gray scale ranges Rvp and Rvn with those of FIG. 13, the lowest positive gray scale data after correction at the center section C of the panel in FIG. 13 is higher by cp1 than that in FIG. 2 and the lowest positive gray scale data that is equal to ap1 at the end sections A of the panel is also higher than that in FIG. 2. The same applies to the intermediate sections B of the panel. Further, though gray scale data is lost on the highest gray scale level side at both the intermediate sections B and the center section C of the panel in the case of FIG. 13, the gray scale data is not lost in FIG. 2. Characteristics of this positive gray scale data also applies to the negative gray scale data. In conclusion, the gray scale ranges Rvp and Rvn become wider in FIG. 2 than in FIG. 13 all over the panel. In particular, it means to widen a reproduction range at the center section of the display panel that the gray scale ranges Rvp and Rvn at the center section C of the panel become wider than conventional ranges. Therefore, this significantly contributes to improvement in display quality.

The following explains a specific example of gray scale correction for compensating the voltage ΔVd in accordance with a position of a column, by using lookup tables that are provided inside the memory 51e and that store relations between the input gray scale data and corrected gray scale data. Table 5 shows a lookup table for the positive gray scale data. Meanwhile, Table 6 shows a lookup table for the negative gray scale data.

TABLE 5

| Input Gray Scale Level | (End) | Corrected Gray Scale Level Corresponding To Column Position | | | | | | (Center) |
|---|---|---|---|---|---|---|---|---|
| | 1 | 96 | 192 | 288 | 384 | 576 | 768 | 960 |
| 0 | 4 | 4 | 3 | 3 | 3 | 2 | 0 | 0 |
| 8 | 10 | 9 | 9 | 9 | 8 | 8 | 8 | 8 |
| 16 | 21 | 19 | 19 | 19 | 18 | 17 | 17 | 16 |
| 24 | 37 | 33 | 32 | 31 | 30 | 27 | 26 | 24 |
| 32 | 67 | 52 | 50 | 49 | 45 | 38 | 36 | 32 |
| 40 | 98 | 78 | 76 | 72 | 64 | 54 | 47 | 40 |
| 48 | 119 | 97 | 94 | 91 | 80 | 68 | 59 | 48 |
| 64 | 147 | 123 | 120 | 116 | 107 | 92 | 80 | 64 |
| 96 | 184 | 163 | 159 | 155 | 145 | 129 | 114 | 96 |
| 128 | 223 | 196 | 193 | 189 | 179 | 163 | 149 | 128 |
| 192 | 300 | 273 | 267 | 263 | 251 | 231 | 216 | 192 |
| 256 | 364 | 339 | 334 | 330 | 317 | 298 | 281 | 256 |
| 320 | 409 | 394 | 390 | 386 | 377 | 358 | 343 | 320 |
| 384 | 444 | 430 | 428 | 426 | 420 | 409 | 401 | 384 |
| 448 | 503 | 488 | 487 | 484 | 477 | 468 | 460 | 448 |
| 512 | 575 | 558 | 556 | 553 | 547 | 535 | 526 | 512 |
| 576 | 637 | 622 | 619 | 617 | 610 | 600 | 590 | 576 |
| 640 | 701 | 684 | 681 | 678 | 673 | 662 | 654 | 640 |
| 704 | 766 | 752 | 750 | 747 | 740 | 728 | 719 | 704 |
| 768 | 808 | 801 | 801 | 799 | 796 | 788 | 781 | 768 |
| 832 | 854 | 849 | 848 | 847 | 845 | 840 | 837 | 832 |
| 864 | 883 | 878 | 877 | 877 | 874 | 871 | 869 | 864 |
| 896 | 910 | 906 | 906 | 905 | 904 | 901 | 899 | 896 |
| 928 | 938 | 935 | 935 | 934 | 933 | 931 | 930 | 928 |
| 960 | 966 | 964 | 964 | 964 | 963 | 962 | 961 | 960 |
| 992 | 1000 | 998 | 997 | 997 | 997 | 995 | 994 | 992 |
| 1023 | 1023 | 1023 | 1023 | 1023 | 1023 | 1023 | 1023 | 1023 |

TABLE 6

| Input Gray Scale Level | (End) | Corrected Gray Scale Level Corresponding To Column Position | | | | | | (Center) |
|---|---|---|---|---|---|---|---|---|
| | 1 | 96 | 192 | 288 | 384 | 576 | 768 | 960 |
| 0 | 0 | 0 | 0 | 0 | 0 | 0 | 0 | 0 |
| 8 | 5 | 6 | 6 | 6 | 7 | 7 | 8 | 8 |
| 16 | 13 | 14 | 14 | 14 | 14 | 15 | 15 | 16 |
| 24 | 18 | 19 | 20 | 20 | 20 | 22 | 23 | 24 |
| 32 | 22 | 24 | 24 | 25 | 26 | 28 | 29 | 32 |
| 40 | 26 | 28 | 29 | 29 | 31 | 33 | 36 | 40 |
| 48 | 28 | 31 | 32 | 32 | 34 | 37 | 41 | 48 |
| 64 | 32 | 36 | 37 | 38 | 41 | 46 | 52 | 64 |
| 96 | 40 | 48 | 50 | 52 | 57 | 68 | 77 | 96 |
| 128 | 54 | 69 | 71 | 74 | 83 | 98 | 110 | 128 |
| 192 | 105 | 126 | 130 | 133 | 143 | 160 | 173 | 192 |
| 256 | 162 | 183 | 187 | 190 | 201 | 220 | 233 | 256 |
| 320 | 219 | 243 | 247 | 252 | 263 | 282 | 296 | 320 |
| 384 | 287 | 314 | 318 | 322 | 332 | 350 | 363 | 384 |
| 448 | 394 | 409 | 412 | 414 | 419 | 429 | 437 | 448 |
| 512 | 458 | 472 | 474 | 476 | 482 | 492 | 499 | 512 |
| 576 | 518 | 532 | 533 | 536 | 543 | 554 | 563 | 576 |
| 640 | 583 | 598 | 601 | 603 | 609 | 619 | 628 | 640 |
| 704 | 646 | 659 | 663 | 664 | 670 | 679 | 689 | 704 |
| 768 | 710 | 727 | 729 | 731 | 738 | 748 | 757 | 768 |
| 832 | 808 | 815 | 816 | 816 | 819 | 823 | 827 | 832 |
| 864 | 846 | 850 | 851 | 852 | 855 | 858 | 861 | 864 |
| 896 | 880 | 885 | 886 | 886 | 889 | 891 | 893 | 896 |
| 928 | 917 | 919 | 920 | 920 | 922 | 924 | 925 | 928 |

TABLE 6-continued

| Input Gray Scale Level | (End) | Corrected Gray Scale Level Corresponding To Column Position | | | | | | (Center) |
|---|---|---|---|---|---|---|---|---|
| | 1 | 96 | 192 | 288 | 384 | 576 | 768 | 960 |
| 960 | 953 | 955 | 955 | 955 | 956 | 957 | 959 | 960 |
| 992 | 982 | 984 | 984 | 986 | 986 | 987 | 989 | 992 |
| 1023 | 1009 | 1012 | 1012 | 1012 | 1012 | 1013 | 1018 | 1023 |

In Tables 5 and 6, the number of bits for representing gray scale data and a resolution of the display panel are the same as in the case of Tables 1 and 2.

As shown in Table 5, regarding the positive gray scale data, due to the correction, no gray scale data is lost at the center (corresponding to the center section C of the panel). Further, at edges (corresponding to the end sections A of the panel), only 4 gray scale levels from "0" to "3" are lost on the lowest gray scale level side.

Further, as shown in Table 6, regarding the negative gray scale data, due to the correction, no gray scale data is lost at the center (corresponding to the center section C of the panel). Further, at the edges (corresponding to the end sections A of the panel), only 14 gray scale levels from "1010" to "1023" are lost on the highest gray scale level side.

In this way, according to the present example, it is possible to realize a display device capable of ensuring a wide reproduction range by compensating an in-plane distribution of a feed through phenomenon by correction of gray scale data.

Further, according to the present example, it is possible to use for display a full gray scale range at the center section of the panel. This makes it possible to provide a high display quality.

EXAMPLE 3

Figure 3:
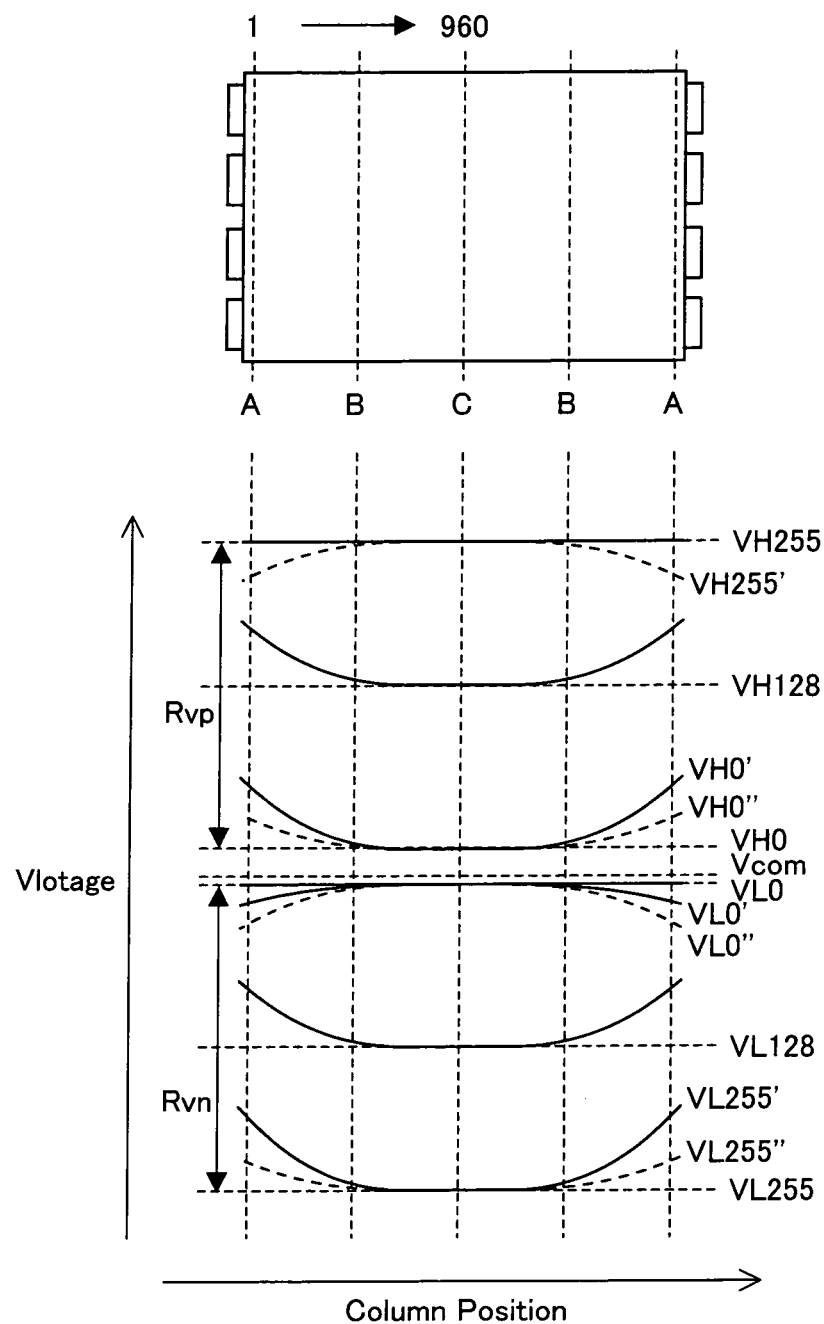
FIG. 3 illustrates an embodiment of the present invention and is a diagram illustrating a third method for compensating an in-plane distribution of a feed through phenomenon.

FIG. 3 is a diagram illustrating gray scale correction related to Example 3. In the graph, what are indicated by a vertical axis and a horizontal axis are the same as in FIG. 13.

In FIG. 3, as in the case of FIG. 2, at the center section C of the panel, a full gray scale range can be used. Further, for each position of each column of the whole panel, gray scale correction is carried out which gray scale correction makes voltages across the liquid crystal layer of positive gray scale data and negative gray scale data equal to each other after the occurrence of the feed through phenomenon.

Regarding the lowest positive gray scale data, with respect to input gray scale data "0", correction is carried out so that a correction amount is 0, that is, a data signal potential becomes VH0 at a position of a column at the center section C of the panel. In an area from the center section C to the center sections C through the intermediate sections B, each value of the gray scale data is increased in the correction by adding a correction amount that is greater than a correction amount corresponding to a difference in voltage ΔVd from a voltage ΔVd of the center section C of the panel which difference corresponds to a position of each column. In this case, in a case where a potential corresponding to corrected gray scale data is VH0', the picture element electrode potential after the occurrence of the feed through phenomenon is lower by the voltage ΔVd of the center section C of the panel, as compared to a curve of a potential VH0" that passes through a point of a potential VH0 at the center section C of the panel and that indicates a potential that is lower than a potential VH0' by a correction amount corresponding to a difference in voltage ΔVd from the center section C of the panel which difference corresponds to a position of the each column. Further, regarding the highest positive gray scale data, for setting the picture element electrode potential after the occurrence of the feed through phenomenon to be a value that is as high as possible at a position of each column in a condition where the picture element electrode potential is not uniform in a plane, the gray scale data at respective positions of all columns is corrected to "255". In this case, a correction amount of all the gray scale data at the center section C of the panel is 0. After the occurrence of the feed through phenomenon, the picture element electrode potential becomes a potential that is decreased by the voltage ΔVd at the center section C of the panel from a curve of VH255' that passes through a point of a potential VH255 at the center section C of the panel and that indicates a potential that is lower than VH255 by a difference in voltage ΔVd from the center section of the panel which difference corresponds to a position of each column.

Regarding the highest negative gray scale data, with respect to input gray scale data "255", correction is carried out so that a correction amount is 0, that is, a data signal potential becomes VL255 at a position of a column at the center section C of the panel. In an area from the center section C to the end sections A through the intermediate sections B of the panel, each value of the gray scale data is decreased in the correction by subtracting a correction amount greater than a correction amount corresponding to a difference in voltage ΔVd from a voltage ΔVd the center section C of the panel which difference corresponds to the position of each column. In this case, in a case where a potential corresponding to corrected gray scale data is VL255', the picture element electrode potential after the occurrence of the feed through phenomenon is lower by the voltage ΔVd at the center section C of the panel, as compared to a curve of a potential VL255'' passes through a point of a potential VL255 at the center section C of the panel and that indicates a potential that is lower than a potential VL255' by a correction amount corresponding to a difference in voltage ΔVd from the center section C of the panel which difference corresponds to a position of each column.

Regarding the lowest negative gray scale data, with respect to input gray scale data "0", correction is carried out so that a correction amount is 0, that is, a data signal potential becomes VL0 at a position of a column at the center section C of the panel. In an area from the center section C to the center sections C through the intermediate sections B of the panel, each value of the gray scale data is increased in the correction by adding a correction amount smaller than a correction amount corresponding to a difference in voltage ΔVd from a voltage ΔVd of the center section C of the panel which difference corresponds to a position of each column. In this case, in a case where a potential corresponding to corrected gray scale data is VL0', the picture element electrode potential after the occurrence of the feed through phenomenon is lower by the voltage ΔVd at the center section C of the panel, as compared to a curve of VL0'' that passes through a point of a potential VL0' at the center section C of the panel and that indicates a potential that is lower than a potential VL0' by a correction amount corresponding to a difference in voltage ΔVd from the center section C of the panel which difference corresponds to a position of each column.

Further, the common electrode potential Vcom is set to a potential that has a center value between a potential that is lower than the potential VH0 by the voltage ΔVd at the center section C of the panel, and a potential that is lower than the potential VL0' by the voltage ΔVd at the center section C of the panel. Further, in the present example, this common electrode voltage Vcom is a potential whose value is a center value between (i) a potential that is lower, by a voltage ΔVd at the center section C of the panel, than a data signal potential corresponding to positive gray scale data and (ii) a potential that is lower by the voltage ΔVd at the center section C of the panel, than a data signal potential corresponding to negative gray scale data, in a case where the positive gray scale data and the negative gray scale data whose gray scale levels are the same are focused at the center section C of the panel.

In the above gray scale correction, at a position of each column, it can be arranged such that a difference between a common electrode potential Vcom and a picture element electrode potential corresponding to corrected positive gray scale data is equal to a difference between the common electrode potential Vcom and a picture element electrode potential corresponding to corrected negative gray scale data.

As a result of this gray scale correction, an output gray scale range that can be displayed by the picture element PIX at the center section C of the panel after the occurrence of the feed through voltage is a gray scale range Rvp that corresponds to voltages corresponding to potentials from the potential VH255 to the potential VH0 in regard to the positive gray scale data, and a gray scale range Rvn that corresponds to voltages corresponding to potentials from the potential VL0 to the potential VL255 in regard to the negative gray scale data. Note that gray scale gradients in each of the gray scale ranges Rvp and Rvn are designed as appropriate.

In comparison of these gray scale ranges Rvp and Rvn with those of FIG. 13, the lowest positive gray scale data after correction at the center section C of the panel in FIG. 13 is higher by cp1 than that in FIG. 3. Further, though gray scale data is lost on the highest gray scale level side at both the intermediate sections B and the center section C of the panel in the case of FIG. 13, the gray scale data is not lost in FIG. 3. Characteristics of this positive gray scale data also applies to the negative gray scale data. In conclusion, the gray scale ranges Rvp and Rvn become wider in FIG. 3 than in FIG. 13 at least at the center section C of the panel. In particular, it means to widen a reproduction range at the center section of the display panel that the gray scale ranges Rvp and Rvn at the center section C of the panel become wider than conventional ranges. Therefore, this significantly contributes to improvement in display quality.

The following explains a specific example of gray scale correction for compensating the voltage ΔVd in accordance with a position of a column, by using lookup tables that are provided inside the memory 51e and that store relations between the input gray scale data and corrected gray scale data. Table 7 shows a lookup table for the positive gray scale data. Meanwhile, Table 8 shows a lookup table for the negative gray scale data.

TABLE 7

| Input Gray Scale | (End) | Corrected Gray Scale Level Corresponding To Column Position | | | | | | (Center) |
|---|---|---|---|---|---|---|---|---|
| Level | 1 | 96 | 192 | 288 | 384 | 576 | 768 | 960 |
| 0 | 8 | 8 | 6 | 6 | 6 | 4 | 0 | 0 |
| 8 | 10 | 9 | 9 | 9 | 8 | 8 | 8 | 8 |
| 16 | 21 | 19 | 19 | 19 | 18 | 17 | 17 | 16 |
| 24 | 37 | 33 | 32 | 31 | 30 | 27 | 26 | 24 |
| 32 | 67 | 52 | 50 | 49 | 45 | 38 | 36 | 32 |
| 40 | 98 | 78 | 76 | 72 | 64 | 54 | 47 | 40 |
| 48 | 119 | 97 | 94 | 91 | 80 | 68 | 59 | 48 |
| 64 | 147 | 123 | 120 | 116 | 107 | 92 | 80 | 64 |
| 96 | 184 | 163 | 159 | 155 | 145 | 129 | 114 | 96 |
| 128 | 223 | 196 | 193 | 189 | 179 | 163 | 149 | 128 |
| 192 | 300 | 273 | 267 | 263 | 251 | 231 | 216 | 192 |
| 256 | 364 | 339 | 334 | 330 | 317 | 298 | 281 | 256 |

TABLE 7-continued

| Input Gray Scale | Corrected Gray Scale Level Corresponding To Column Position | | | | | | |
|---|---|---|---|---|---|---|---|
| | (End) | | | | | | (Center) |
| Level | 1 | 96 | 192 | 288 | 384 | 576 | 768 | 960 |
| 320 | 409 | 394 | 390 | 386 | 377 | 358 | 343 | 320 |
| 384 | 444 | 430 | 428 | 426 | 420 | 409 | 401 | 384 |
| 448 | 503 | 488 | 487 | 484 | 477 | 468 | 460 | 448 |
| 512 | 575 | 558 | 556 | 553 | 547 | 535 | 526 | 512 |
| 576 | 637 | 622 | 619 | 617 | 610 | 600 | 590 | 576 |
| 640 | 701 | 684 | 681 | 678 | 673 | 662 | 654 | 640 |
| 704 | 766 | 752 | 750 | 747 | 740 | 728 | 719 | 704 |
| 768 | 808 | 801 | 801 | 799 | 796 | 788 | 781 | 768 |
| 832 | 854 | 849 | 848 | 847 | 845 | 840 | 837 | 832 |
| 864 | 883 | 878 | 877 | 877 | 874 | 871 | 869 | 864 |
| 896 | 910 | 906 | 906 | 905 | 904 | 901 | 899 | 896 |
| 928 | 938 | 935 | 935 | 934 | 933 | 931 | 930 | 928 |
| 960 | 966 | 964 | 964 | 964 | 963 | 962 | 961 | 960 |
| 992 | 1000 | 998 | 997 | 997 | 997 | 995 | 994 | 992 |
| 1023 | 1023 | 1023 | 1023 | 1023 | 1023 | 1023 | 1023 | 1023 |

TABLE 8

| Input Gray Scale | Corrected Gray Scale Level Corresponding To Column Position | | | | | | |
|---|---|---|---|---|---|---|---|
| | (End) | | | | | | (Center) |
| Level | 1 | 96 | 192 | 288 | 384 | 576 | 768 | 960 |
| 0 | 4 | 4 | 3 | 3 | 3 | 2 | 0 | 0 |
| 8 | 5 | 6 | 6 | 6 | 7 | 7 | 8 | 8 |
| 16 | 13 | 14 | 14 | 14 | 14 | 15 | 15 | 16 |
| 24 | 18 | 19 | 20 | 20 | 20 | 22 | 23 | 24 |
| 32 | 22 | 24 | 24 | 25 | 26 | 28 | 29 | 32 |
| 40 | 26 | 28 | 29 | 29 | 31 | 33 | 36 | 40 |
| 48 | 28 | 31 | 32 | 32 | 34 | 37 | 41 | 48 |
| 64 | 32 | 36 | 37 | 38 | 41 | 46 | 52 | 64 |
| 96 | 40 | 48 | 50 | 52 | 57 | 68 | 77 | 96 |
| 128 | 54 | 69 | 71 | 74 | 83 | 98 | 110 | 128 |
| 192 | 105 | 126 | 130 | 133 | 143 | 160 | 173 | 192 |
| 256 | 162 | 183 | 187 | 190 | 201 | 220 | 233 | 256 |
| 320 | 219 | 243 | 247 | 252 | 263 | 282 | 296 | 320 |
| 384 | 287 | 314 | 318 | 322 | 332 | 350 | 363 | 384 |
| 448 | 394 | 409 | 412 | 414 | 419 | 429 | 437 | 448 |
| 512 | 458 | 472 | 474 | 476 | 482 | 492 | 499 | 512 |
| 576 | 518 | 532 | 533 | 536 | 543 | 554 | 563 | 576 |
| 640 | 583 | 598 | 601 | 603 | 609 | 619 | 628 | 640 |
| 704 | 646 | 659 | 663 | 664 | 670 | 679 | 689 | 704 |
| 768 | 710 | 727 | 729 | 731 | 738 | 748 | 757 | 768 |
| 832 | 808 | 815 | 816 | 816 | 819 | 823 | 827 | 832 |
| 864 | 846 | 850 | 851 | 852 | 855 | 858 | 861 | 864 |
| 896 | 880 | 885 | 886 | 886 | 889 | 891 | 893 | 896 |
| 928 | 917 | 919 | 920 | 920 | 922 | 924 | 925 | 928 |
| 960 | 953 | 955 | 955 | 956 | 957 | 959 | 960 |
| 992 | 982 | 984 | 984 | 986 | 986 | 987 | 989 | 992 |
| 1023 | 995 | 1001 | 1001 | 1001 | 1001 | 1003 | 1013 | 1023 |

In Tables 7 and 8, the number of bits for representing gray scale data and a resolution of the display panel are the same as in the case of Tables 1 and 2.

As shown in Table 7, regarding the positive gray scale data, due to the correction, no gray scale data is lost at the center (corresponding to the center section C of the panel). Further, at edges (corresponding to the end sections A of the panel), only 8 gray scale levels from "0" to "7" are lost on the lowest gray scale level side.

Further, as shown in Table 8, regarding the negative gray scale data, due to the correction, no gray scale data is lost at the center (corresponding to the center section C of the panel). Further, at the edges (corresponding to the end sections A of the panel), 4 gray scale levels from "0" to "3" are lost on the lowest gray scale level side, while 28 gray scale levels from "996" to "1023" are lost on the highest gray scale level side.

In this way, according to the present example, it is possible to realize a display device capable of ensuring a wide reproduction range by compensating an in-plane distribution of a feed through phenomenon by correction of gray scale data.

Further, according to the present example, it is possible to use for display a full gray scale range at the center section C of the panel. This makes it possible to provide a high display quality. Further, at a position of each column, it can be arranged such that a difference between a common electrode potential Vcom and a picture element electrode potential corresponding to corrected positive gray scale data is equal to a difference between the common electrode potential Vcom and a picture element electrode potential corresponding to corrected negative gray scale data.

EXAMPLE 4

Figure 4:
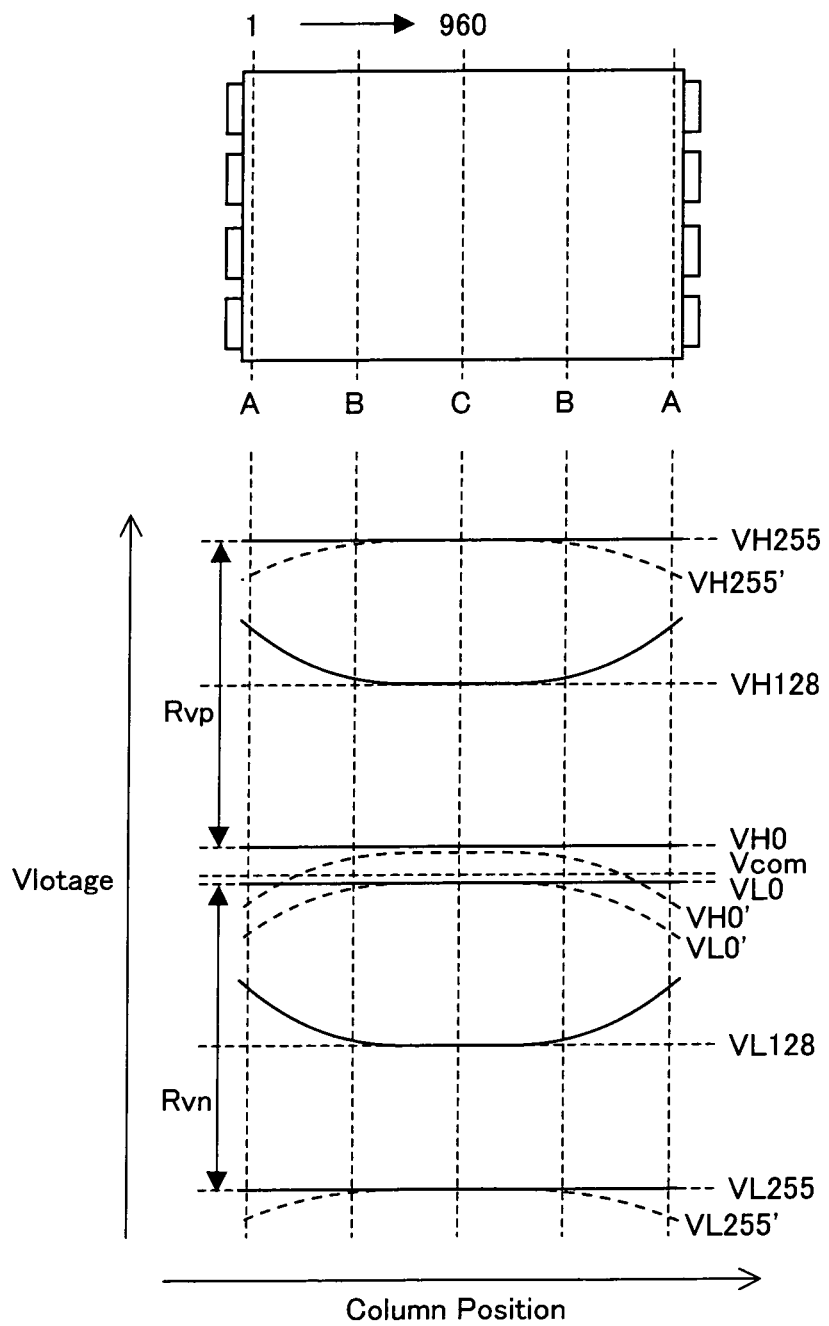
FIG. 4 illustrates an embodiment of the present invention and is a diagram illustrating a fourth method for compensating an in-plane distribution of a feed through phenomenon.

FIG. 4 is a diagram illustrating gray scale correction related to Example 4. In the graph, what are indicated by a vertical axis and a horizontal axis are the same as in FIG. 13.

In FIG. 4, regarding the lowest positive gray scale data, for setting the picture element electrode potential after the occurrence of the feed through phenomenon to the possible lowest value at a position of each column in a condition where the picture element electrode potential after the occurrence of the feed through phenomenon is not uniform in a plane, gray scale data at respective positions of all the columns are set to "0". In this case, a correction amount for all the gray scale data is 0. After the occurrence of the feed through phenomenon, the picture element electrode potential is a potential that is lower by the voltage ΔVd of the center section C of the panel, as compared to a curve of VH0' that passes through a point of a potential VH0 at the center section C of the panel and that indicates a potential that is lower than VH0 by a difference in voltage ΔVd from the center section C of the panel which difference corresponds to the position of each column which curve.

Further, regarding the highest positive gray scale data, for setting the picture element electrode potential after the occurrence of the feed through phenomenon to be a value that is as high as possible at a position of each column in a condition where the picture element electrode potential is not uniform in a plane, the gray scale data at respective positions of all columns is corrected to "255". In this case, a correction amount for all the gray scale data is 0. After the occurrence of the feed through phenomenon, the picture element electrode potential becomes a potential that is lower by the voltage ΔVd at the center section C of the panel from a curve of VH255' that passes through a point of a potential VH255 at the center section C of the panel and that indicates a potential that is lower than VH255 by a difference in voltage ΔVd from the center section C of the panel which difference corresponds to a position of each column.

Regarding the highest negative gray scale data, for setting the picture element electrode potential after the occurrence of the feed through phenomenon to be a value that is as low as possible at a position of each column in a condition where the picture element electrode potential is not uniform in a plane, the gray scale data at respective positions of all the columns is corrected to "255". In this case, a correction amount for all the gray scale data is 0. After the occurrence of the feed through phenomenon, the picture element electrode potential becomes a potential that is lower by the voltage ΔVd at the center section C of the panel, as compared to a curve of VL255' that passes through a point of a potential VL255 at the center section C of the panel and that indicates a potential that is lower than VL255 by a correction amount corresponding to a difference in voltage ΔVd from the center section C of the panel which difference corresponds to a position of each column.

Regarding the lowest negative gray scale data, for setting the picture element electrode potential after the occurrence of the feed through phenomenon to be a value as high as possible at a position of each the column in a condition where the picture element electrode potential is not uniform in a plane, the gray scale data at respective positions of all the columns is corrected to "0". In this case, a correction amount for all the gray scale data is 0. After the occurrence of the feed through phenomenon, the picture element electrode potential becomes a potential that is lower by the voltage ΔVd at the center section C of the panel, as compared to a curve of VL0' that passes through a point of a potential VL0 at the center section C of the panel and that indicates a potential that is lower than VL0 by a correction amount corresponding to a difference in voltage ΔVd from the center section C of the panel which difference corresponds to a position of each column.

Further, the common electrode potential Vcom is set to a potential that has a center value between a potential that is lower than the potential VH0 by the voltage ΔVd at the center section C of the panel and a potential that is lower than the potential VL0' by the voltage ΔVd at the center section C of the panel. Further, in the present example, this common electrode voltage Vcom is a potential whose value is a center value between (i) a potential that is lower, by a voltage ΔVd at a position of each column of the whole panel, than a data signal potential corresponding to positive gray scale data and (ii) a potential that is lower, by the voltage ΔVd at the position of each column, than a data signal potential corresponding to negative gray scale data, in a case where the positive gray scale data and the negative gray scale data whose gray scale levels are the same are focused at the position of each column.

In the above gray scale correction, at the position of each column, it can be arranged such that a difference between a common electrode potential and a picture element electrode potential corresponding to corrected positive gray scale data is equal to a difference between the common electrode potential and a picture element electrode potential corresponding to corrected negative gray scale data.

As a result of this gray scale correction, an output gray scale range that can be displayed by the picture element PIX at the center section C of the panel after the occurrence of the feed through voltage is a gray scale range Rvp that corresponds to voltages corresponding to potentials from the potential VH255 to the potential VH0 in regard to the positive gray scale data, and a gray scale range Rvn that corresponds to voltages corresponding to potentials from the potential VL0 to the potential VL255 in regard to the negative gray scale data. Note that gray scale gradients in each of the gray scale ranges Rvp and Rvn are designed as appropriate.

In comparison of these gray scale ranges Rvp and Rvn with those of FIG. 13, the lowest positive gray scale data after correction at the center section C of the panel in FIG. 13 is higher by cp1 than that in FIG. 4. Further, though gray scale data is lost on the highest gray scale level side at both the intermediate sections B and the center section C of the panel in the case of FIG. 13, the gray scale data is not lost in FIG. 4. Characteristics of this positive gray scale data also applies to the negative gray scale data. In conclusion, the gray scale ranges Rvp and Rvn become wider in FIG. 4 than in FIG. 13 all over the panel. In particular, it means to widen a reproduction range at the center section C of the display panel that the gray scale ranges Rvp and Rvn at the center section of the panel become wider larger than conventional ranges. Therefore, this significantly contributes to improvement in display quality.

The following explains a specific example of gray scale correction for compensating the voltage ΔVd in accordance with a position of a column, by using lookup tables that are provided inside the memory 51e and that store relations between the input gray scale data and corrected gray scale data. Table 9 shows a lookup table for the positive gray scale data. Meanwhile, Table 10 shows a lookup table for the negative gray scale data.

TABLE 9

| Input Gray Scale Level | (End) | Corrected Gray Scale Level Corresponding To Column Position | | | | | | (Center) |
|---|---|---|---|---|---|---|---|---|
| | 1 | 96 | 192 | 288 | 384 | 576 | 768 | 960 |
| 0 | 0 | 0 | 0 | 0 | 0 | 0 | 0 | 0 |
| 8 | 10 | 9 | 9 | 9 | 8 | 8 | 8 | 8 |
| 16 | 21 | 19 | 19 | 19 | 18 | 17 | 17 | 16 |
| 24 | 37 | 33 | 32 | 31 | 30 | 27 | 26 | 24 |
| 32 | 67 | 52 | 50 | 49 | 45 | 38 | 36 | 32 |
| 40 | 98 | 78 | 76 | 72 | 64 | 54 | 47 | 40 |
| 48 | 119 | 97 | 94 | 91 | 80 | 68 | 59 | 48 |
| 64 | 147 | 123 | 120 | 116 | 107 | 92 | 80 | 64 |
| 96 | 184 | 163 | 159 | 155 | 145 | 129 | 114 | 96 |
| 128 | 223 | 196 | 193 | 189 | 179 | 163 | 149 | 128 |
| 192 | 300 | 273 | 267 | 263 | 251 | 231 | 216 | 192 |
| 256 | 364 | 339 | 334 | 330 | 317 | 298 | 281 | 256 |
| 320 | 409 | 394 | 390 | 386 | 377 | 358 | 343 | 320 |
| 384 | 444 | 430 | 428 | 426 | 420 | 409 | 401 | 384 |
| 448 | 503 | 488 | 487 | 484 | 477 | 468 | 460 | 448 |
| 512 | 575 | 558 | 556 | 553 | 547 | 535 | 526 | 512 |
| 576 | 637 | 622 | 619 | 617 | 610 | 600 | 590 | 576 |
| 640 | 701 | 684 | 681 | 678 | 673 | 662 | 654 | 640 |
| 704 | 766 | 752 | 750 | 747 | 740 | 728 | 719 | 704 |
| 768 | 808 | 801 | 801 | 799 | 796 | 788 | 781 | 768 |
| 832 | 854 | 849 | 848 | 847 | 845 | 840 | 837 | 832 |
| 864 | 883 | 878 | 877 | 877 | 874 | 871 | 869 | 864 |
| 896 | 910 | 906 | 906 | 905 | 904 | 901 | 899 | 896 |
| 928 | 938 | 935 | 935 | 934 | 933 | 931 | 930 | 928 |
| 960 | 966 | 964 | 964 | 964 | 963 | 962 | 961 | 960 |
| 992 | 1000 | 998 | 997 | 997 | 997 | 995 | 994 | 992 |
| 1023 | 1023 | 1023 | 1023 | 1023 | 1023 | 1023 | 1023 | 1023 |

TABLE 10

| Input Gray Scale Level | (End) | Corrected Gray Scale Level Corresponding To Column Position | | | | | | (Center) |
|---|---|---|---|---|---|---|---|---|
| | 1 | 96 | 192 | 288 | 384 | 576 | 768 | 960 |
| 0 | 0 | 0 | 0 | 0 | 0 | 0 | 0 | 0 |
| 8 | 5 | 6 | 6 | 6 | 7 | 7 | 8 | 8 |
| 16 | 13 | 14 | 14 | 14 | 14 | 15 | 15 | 16 |
| 24 | 18 | 19 | 20 | 20 | 20 | 22 | 23 | 24 |
| 32 | 22 | 24 | 24 | 25 | 26 | 28 | 29 | 32 |
| 40 | 26 | 28 | 29 | 29 | 31 | 33 | 36 | 40 |
| 48 | 28 | 31 | 32 | 32 | 34 | 37 | 41 | 48 |
| 64 | 32 | 36 | 37 | 38 | 41 | 46 | 52 | 64 |
| 96 | 40 | 48 | 50 | 52 | 57 | 68 | 77 | 96 |
| 128 | 54 | 69 | 71 | 74 | 83 | 98 | 110 | 128 |
| 192 | 105 | 126 | 130 | 133 | 143 | 160 | 173 | 192 |
| 256 | 162 | 183 | 187 | 190 | 201 | 220 | 233 | 256 |
| 320 | 219 | 243 | 247 | 252 | 263 | 282 | 296 | 320 |
| 384 | 287 | 314 | 318 | 322 | 332 | 350 | 363 | 384 |
| 448 | 394 | 409 | 412 | 414 | 419 | 429 | 437 | 448 |
| 512 | 458 | 472 | 474 | 476 | 482 | 492 | 499 | 512 |
| 576 | 518 | 532 | 533 | 536 | 543 | 554 | 563 | 576 |
| 640 | 583 | 598 | 601 | 603 | 609 | 619 | 628 | 640 |
| 704 | 646 | 659 | 663 | 664 | 670 | 679 | 689 | 704 |
| 768 | 710 | 727 | 729 | 731 | 738 | 748 | 757 | 768 |
| 832 | 808 | 815 | 816 | 816 | 819 | 823 | 827 | 832 |
| 864 | 846 | 850 | 851 | 852 | 855 | 858 | 861 | 864 |

TABLE 10-continued

| Input Gray Scale Level | (End) | Corrected Gray Scale Level Corresponding To Column Position | | | | | | (Center) |
|---|---|---|---|---|---|---|---|---|
| | 1 | 96 | 192 | 288 | 384 | 576 | 768 | 960 |
| 896 | 880 | 885 | 886 | 886 | 889 | 891 | 893 | 896 |
| 928 | 917 | 919 | 920 | 920 | 922 | 924 | 925 | 928 |
| 960 | 953 | 955 | 955 | 955 | 956 | 957 | 959 | 960 |
| 992 | 982 | 984 | 984 | 986 | 986 | 987 | 989 | 992 |
| 1023 | 1023 | 1023 | 1023 | 1023 | 1023 | 1023 | 1023 | 1023 |

In Tables 9 and 10, the number of bits for representing gray scale data and a resolution of the display panel are the same as in the case of Tables 1 and 2.

As shown in Table 9, regarding both the positive gray scale data and the negative gray scale data, due to the correction, no gray scale data is lost in the whole panel.

In this way, according to the present example, it is possible to realize a display device capable of ensuring a wide reproduction range by compensating an in-plane distribution of a feed through phenomenon by correction of gray scale data.

Further, according to the present example, it is possible to use for display an entire scale range all over the panel.

The above described the present embodiment.

Note that Examples 1 to 3 of the above examples carry out gray scale correction in which a correction amount of the lowest positive gray scale data and the lowest negative gray scale data is 0, with respect to gray scale data (first gray scale data) to be supplied to a position of a column at the center section of the panel. However, the present invention is not limited to this arrangement. For example, it is possible to set the position of the column at the center section of the panel to include a plurality of columns or to carry out the same process as in Examples 1 to 3 on at least one column of a part of all the columns.

Moreover, the above examples provide an explanation on a configuration in which gray scale correction is carried out on gray scale data to be supplied to a display driver. However, a function to carry out the gray scale correction may be provided in a data signal line driver and the gray scale correction may be carried out on gray scale data to be converted into data signals.

Further, the above examples provide an explanation on gray scale correction on assumption that a voltage ΔVd is to be compensated. However, the present invention is not limited to such gray scale correction, but can be applied to all cases of phenomena in which an in-plain distribution occurs in picture element electrode potential.

Furthermore, in the above examples, the two gate drivers GD1 and GD2 are prepared and a gate pulse is supplied from both ends of each gate bus line GL. However, the present invention is not limited to this configuration. The present invention may be arranged such that only one gate driver is prepared and a gate pulse is supplied from a predetermined one end to all the gate bus lines GL. In such a case, the above examples can be applied in accordance with an in-plane distribution of the voltage ΔVd that occurs in a case where a gate pulse is supplied from one end. Because the above examples can be applied, as described above, to all cases of phenomena in which in-plain distribution occurs in picture element electrode potential, it is possible to assume any in-plane distribution that is different from the in-plane distribution of the voltage ΔVd even in a case where the gate pulse is supplied from one end. Accordingly, it is naturally possible to carry out gray scale correction in accordance with a position on a panel such as the end sections A, the intermediate sections B, and the center section C of the panel as in the above examples.

In addition, in the above examples, it may be arranged such that: a correction amount corresponding to a position of a part of columns is stored in a lookup table in the memory 51e; gray scale correction is carried out on input gray scale data corresponding to the position of the part of the columns, by using, as the correction amount, a value stored in the lookup table; and gray scale correction is carried out on input gray scale data corresponding to a position of other column, by obtaining a correction amount by an interpolation operation with use of a value stored in the lookup table. In such a configuration, it is possible to reduce the number of values of the correction amount to be stored in the lookup table. This makes it possible to reduce a size of a display device.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is suitably applied to television devices or monitor devices.

REFERENCE SIGNS LIST 1 liquid crystal display device (display device)
2 display panel
5 display controller
51c ΔVd correction section (correction section)
GL gate bus line
SL source bus line
SD1, SD2 source driver (display driver)
PIX picture element
Vcom common electrode potential

The invention claimed is:

1. A display device of an active matrix type comprising:
a correction section for carrying out gray scale correction on gray scale data to be converted into a data signal, by use of a correction amount corresponding to a position of each column to which the data signal is to be supplied, each column being on a display panel,
the correction section carrying out the gray scale correction by setting the correction amount to zero for at least (i) gray scale data corresponding to a lowest positive-polarity data signal potential and (ii) gray scale data corresponding to a lowest negative-polarity data signal potential of first gray scale data to be supplied to at least one column constituting a part of all columns, the gray scale data (i) and (ii) being among the gray scale data inputted into the correction section, and
the correction amount corresponds to a scale of a feed-through voltage corresponding to the position of each column, the feed-through voltage being an amount of decrease in a potential of a picture element electrode resulting from a fall of a gate pulse.

2. The display device as set forth in claim 1, wherein:
the correction section carries out the gray scale correction by setting the correction amount to zero for at least (i) gray scale data corresponding to a lowest positive-polarity data signal potential and (ii) gray scale data corresponding to a lowest negative-polarity data signal potential of first gray scale data to be supplied to at least one column positioned at a center out of all the columns, the gray scale data (i) and (ii) being among the gray scale data inputted.

3. The display device as set forth in claim 1, wherein:
a highest positive-polarity data signal potential corresponding to the first gray scale data after the gray scale correction is lower than a highest positive-polarity data signal potential corresponding to the gray scale data other than the first gray scale data after the gray scale correction; and
a highest negative-polarity data signal potential corresponding to the first gray scale data after the gray scale correction is lower than a highest negative-polarity data signal potential corresponding to the gray scale data other than the first gray scale data after the gray scale correction.

4. The display device as set forth in claim 1, wherein:
for all the columns, the gray scale correction is carried out by setting the correction amount to zero for gray scale data corresponding to a highest positive-polarity data signal potential; and
for all the columns, the gray scale correction is carried out by setting the correction amount to zero for gray scale data corresponding to a highest negative-polarity data signal potential.

5. The display device as set forth in claim 1, wherein:
for all the columns, the gray scale correction is carried out by setting the correction amount to zero for gray scale data corresponding to a highest positive-polarity data signal potential; and
a highest negative-polarity data signal potential corresponding to the first gray scale data after the gray scale correction is higher than a highest negative-polarity potential corresponding to the gray scale data other than the first gray scale data after the gray scale correction.

6. A display device of an active matrix type comprising:
a correction section for carrying out gray scale correction on gray scale data to be converted into a data signal, by use of a correction amount corresponding to a position of each column to which the data signal is supplied, each column being on a display panel,
the correction section carrying out the gray scale correction by setting the correction amount to zero for (i) gray scale data corresponding a lowest positive-polarity data signal potential, (ii) gray scale data corresponding to a lowest negative-polarity data signal potential, (iii) gray scale data corresponding to a highest positive-polarity data signal potential, and (iv) gray scale data corresponding to a highest negative-polarity data signal potential for all the columns, the gray scale data (i), (ii), (iii), and (iv) being among the gray scale data inputted, and
the correction amount corresponds to a scale of a feed-through voltage corresponding to the position of each column, the feed-through voltage being an amount of decrease in a potential of a picture element electrode resulting from a fall of a gate pulse.

7. The display device as set forth in claim 1, wherein the gray scale data to be converted into the data signal is gray scale data to be supplied to a display driver.

8. The display device as set forth in claim 1, wherein a gate pulse is supplied to each gate bus line from each of both ends of the each gate bus line.

9. The display device as set forth in claim 1, wherein a gate pulse is supplied to each gate bus line from one predetermined end of the each gate bus line.

10. The display device as set forth in claim 1, wherein:
the correction amount corresponding to a position of a part of the columns is stored in a lookup table;
the gray scale correction is carried out on the gray scale data corresponding to the position of the part of the columns, by using, as the correction amount, a value stored in the lookup table; and
the gray scale correction is carried out on the gray scale data corresponding to a position of other column, by obtaining the correction amount by an interpolation operation with use of the value stored in the lookup table.

11. A method for driving a display device of an active matrix type, the method comprising the step of:
carrying out gray scale correction on gray scale data to be converted into a data signal, by use of a correction amount corresponding to a position of each column to which the data signal is to be supplied, each column being on a display panel,
the step of carrying out the gray scale correction being performed by setting the correction amount to zero for at least (i) gray scale data corresponding to a lowest positive-polarity data signal potential and (ii) gray scale data corresponding to a lowest negative-polarity data signal potential of first gray scale data to be supplied to at least one column constituting a part of all columns, the gray scale data (i) and (ii) being among the gray scale data provided for the gray scale correction, and
the correction amount corresponds to a scale of a feed-through voltage corresponding to the position of each column, the feed-through voltage being an amount of decrease in a potential of a picture element electrode resulting from a fall of a gate pulse.

12. The method as set forth in claim 11, wherein:
the gray scale correction is carried out by setting the correction amount to zero for at least (i) gray scale data corresponding to a lowest positive-polarity data signal potential and (ii) gray scale data corresponding to a lowest negative-polarity data signal potential of first gray scale data to be supplied to at least one column positioned at a center out of all the columns, the gray scale data (i) and (ii) being among the gray scale data provided for the gray scale correction.

13. The method as set forth in claim 11, wherein:
a highest positive-polarity data signal potential corresponding to the first gray scale data after the gray scale correction is lower than a highest positive-polarity data signal potential corresponding to the gray scale data other than the first gray scale data after the gray scale correction; and
a highest negative-polarity data signal potential corresponding to the first gray scale data after the gray scale correction is lower than a highest negative-polarity data signal potential corresponding to the gray scale data other than the first gray scale data after the gray scale correction.

14. The method as set forth in claim 11, wherein:
for all the columns, the gray scale correction is carried out by setting the correction amount to zero for gray scale data corresponding to a highest positive-polarity data signal potential; and
for all the columns, the gray scale correction is carried out by setting the correction amount to zero for gray scale data corresponding to a highest negative-polarity data signal potential.

15. The method as set forth in claim 11, wherein:
for all the columns, the gray scale correction is carried out by setting the correction amount to zero for gray scale data corresponding to a highest positive-polarity data signal potential; and
the gray scale correction is carried out so that a highest negative-polarity data signal potential corresponding to the first gray scale data after the gray scale correction becomes higher than a highest negative-polarity potential corresponding to the gray scale data other than the first gray scale data after the gray scale correction.

16. A method for driving a display device of an active matrix type, the method comprising the step of:
carrying out gray scale correction on gray scale data to be converted into a data signal, by use of a correction amount corresponding to a position of each column to which the data signal is supplied, each column being on a display panel,
the gray scale correction is carried out by setting the correction amount to zero for (i) gray scale data corresponding a lowest positive-polarity data signal potential, (ii) gray scale data corresponding to a lowest negative-polarity data signal potential, (iii) gray scale data corresponding to a highest positive-polarity data signal potential, and (iv) gray scale data corresponding to a highest negative-polarity data signal potential for all the columns, the gray scale data (i), (ii), (iii), and (iv) being among the gray scale data supplied for the gray scale correction, and
the correction amount corresponds to a scale of a feed-through voltage corresponding to the position of each column, the feed-through voltage being an amount of decrease in a potential of a picture element electrode resulting from a fall of a gate pulse.

17. The method as set forth in claim 11, wherein the gray scale data to be converted into the data signal is gray scale data to be supplied to a display driver.

18. The method as set forth in claim 11, wherein a gate pulse is supplied to each gate bus line from each of both ends of the each gate bus line.

19. The method as set forth in claim 11, wherein a gate pulse is supplied to each gate bus line from one end of the each gate bus line.

20. The method as set forth in claim 11, wherein:
the correction amount corresponding to a position of a part of the columns is stored in a lookup table;
the gray scale correction is carried out on the gray scale data corresponding to the position of the part of the columns, by using, as the correction amount, a value stored in the lookup table; and
the gray scale correction is carried out on the gray scale data corresponding to a position of other column, by obtaining the correction amount by an interpolation operation with use of the value stored in the lookup table.

21. The display device as set forth in claim 1, wherein the correction section is configured to carry out gray scale correction by use of the correction amount corresponding to the scale of the feed-through voltage regardless of gray scale data in an immediately preceding frame.

22. The method as set forth in claim 11, wherein the gray scale correction is carried out by use of the correction amount corresponding to the scale of the feed-through voltage regardless of gray scale data in an immediately preceding frame.

* * * * *